(12) United States Patent
Abe et al.

(10) Patent No.: US 10,036,194 B2
(45) Date of Patent: Jul. 31, 2018

(54) PRODUCTION METHOD OF MULTIPLE PANES

(71) Applicant: Panasonic Intellectual Property Management Co., Ltd., Osaka (JP)

(72) Inventors: Hiroyuki Abe, Osaka (JP); Masataka Nonaka, Hyogo (JP); Hideki Yoshida, Kyoto (JP); Eiichi Uriu, Osaka (JP); Kenji Hasegawa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 647 days.

(21) Appl. No.: 14/546,371

(22) Filed: Nov. 18, 2014

(65) Prior Publication Data

US 2015/0068665 A1    Mar. 12, 2015

Related U.S. Application Data

(63) Continuation of application No. PCT/JP2013/003129, filed on May 16, 2013.

(30) Foreign Application Priority Data

May 18, 2012  (JP) ................. 2012-114980

(51) Int. Cl.
*E06B 3/677* (2006.01)
*C03C 27/06* (2006.01)
(Continued)

(52) U.S. Cl.
CPC ............ *E06B 3/6775* (2013.01); *C03C 27/06* (2013.01); *E06B 3/6612* (2013.01); *E06B 3/66304* (2013.01); *E06B 2003/66338* (2013.01)

(58) Field of Classification Search
CPC ........ E06B 3/677; E06B 3/6775; C03C 27/06
(Continued)

(56) References Cited

U.S. PATENT DOCUMENTS 5,664,395 A    9/1997 Collins et al.
5,820,435 A    10/1998 Cooper et al.
(Continued)

FOREIGN PATENT DOCUMENTS

JP    07-508967 A    10/1995
JP    10-002161 A    1/1998
(Continued)

OTHER PUBLICATIONS

International Search Report issued in PCT/JP2013/003129, dated Aug. 20, 2013, with English translation.
(Continued)

*Primary Examiner* — Philip C Tucker
*Assistant Examiner* — John A Blades
(74) *Attorney, Agent, or Firm* — McDermott Will & Emery LLP

(57) ABSTRACT

The objective is to propose a production method of multiple panes which can be simple and nevertheless produce a multiple pane in its finished state which does not include any undesired protrusion from an external surface of a glass panel. The production method includes: hermetically bonding, with a sealing member, peripheries of paired glass panels disposed facing each other at a predetermined distance to form a space to be hermetically enclosed between the glass panels; evacuating air from the space through an outlet to make the space be in a reduced pressure state; subsequently dividing the space by a region forming member disposed inside the space to form a partial region which do not include the outlet; and subsequently cutting out the partial regions by cutting the pair of glass panels.

12 Claims, 15 Drawing Sheets

(51) Int. Cl.
*E06B 3/66* (2006.01)
*E06B 3/663* (2006.01)

(58) Field of Classification Search
USPC .......................................................... 156/109
See application file for complete search history.

(56) References Cited

U.S. PATENT DOCUMENTS

| | | |
|---|---|---|
| 6,109,994 A | 8/2000 | Cho et al. |
| 6,416,375 B1 | 7/2002 | Cho et al. |
| 6,827,623 B2 * | 12/2004 | Nakatake ................ H01J 9/261 |
| | | 445/24 |

FOREIGN PATENT DOCUMENTS

| | | | |
|---|---|---|---|
| JP | 10-302951 A | 11/1998 | |
| JP | H10-297944 A | 11/1998 | |
| JP | H11-079795 A | 3/1999 | |
| JP | 11-311069 A | 11/1999 | |
| JP | 2000-510281 A | 8/2000 | |
| JP | 2002-008569 A | 1/2002 | |
| JP | 2003-246633 A | 9/2003 | |
| JP | 2007-015908 A | 1/2007 | |
| WO | 1998-026440 A1 | 6/1998 | |
| WO | 2010/061418 A1 | 6/2010 | |
| WO | WO2010/061418 * | 6/2010 | ................ H01J 9/40 |

OTHER PUBLICATIONS

English Translation of Chinese Final Office Action issued in Chinese Application No. 201380025928.9 dated Feb. 6, 2016.

* cited by examiner

PRODUCTION METHOD OF MULTIPLE PANES

CROSS-REFERENCE TO RELATED APPLICATIONS

The application is continuation of International Application No. PCT/JP2013/003129, filed on May 16, 2013, which claims the benefit of priority of Japanese Patent Application No. 2012-114980, filed on May 18, 2012, the entire contents of which are incorporated herein by reference.

TECHNICAL FIELD

The present disclosure relates to methods of producing multiple panes in which paired glass panels are stacked with a reduced pressure space in-between, and particularly relates to a production method of a multiple pane which an undesired protrusion such as an evacuation pipe used for pressure reduction does not remain after finishing.

BACKGROUND ART

There has been commercialized a multiple pane. In the multiple pane, a pair of glass panels are arranged facing each other, and a plurality of spacers are interposed between the pair of glass panels, and the pair of glass panels are bonded with a hermetically bonding member at peripheries thereof, and thus an inside space is defined by the pair of glass panels and the hermetically bonding. The air in the inside space is exhausted to reduce the pressure of the inside space.

It is expected that the multiple pane in which the pressure of the inside space is reduced shows great thermally insulating effects, dew prevention effects, and sound insulating effects, as a result of presence of a vacuum layer whose pressure is lower than the atmospheric pressure between the pair of glass panels, relative to a multiple pane constituted by two glass plate simply bonded to each other. Therefore, such multiple pane attracts great attentions as one of eco glass in current situations in which the importance of energy strategy rises.

The multiple pane including the inside space with the reduced pressure is produced as follows: the peripheries of the pair of glass panels are hermetically bonded by applying the hermetically bonding seal of low-melting glass frit therebetween and heating them to hermetically bond the peripheries to form a space while a plurality of spacers of metal or ceramics are interposed to keep the predetermined distance between the glass panels, and thereafter air is evacuated from the space via an evacuation pipe of glass or metal. The multiple pane is produced through this production process, and thus the finished product of the multiple pane including the inside space with the reduced pressure includes the evacuation pipe whose tip is closed. Hence, in the multiple pane constituted by transparent glass panels, the evacuation pipe may cause problems that appearance becomes poor and the inside space cannot be kept in the reduced pressure state when the evacuation pipe is broken. In view of this, with regard to the multiple pane used as a window pane, for example, the multiple pane is used so that the evacuation pipe is positioned at the upper-right corner of the indoor side. In other words, the use of the multiple pane is limited so as to prevent visually and physically interference of the evacuation pipe.

In a technique which has been proposed as the conventional production method of multiple pane with the reduced pressure, an evacuation pipe is embedded into one of glass panels until an intermediate in a thickness direction, and the evacuation pipe is sealed with shield for preventing a junction of the glass panel and the evacuation pipe from suffering from heat generated in sealing the evacuation pipe. According to this technique, the evacuation pipe remaining in the finished product is shortened (see patent literature 1 [JP 10-2161 A]). In another technique, an evacuation pipe and a vicinity of a part, on which the evacuation pipe is situated, of a rear surface of a glass panel are covered with a cover member of resin so as to form a gap between the cover member and a sealed tip of the evacuation pipe. According to this technique, breakage of the evacuation pipe caused by impacts from outside can be prevented (see patent literature 2 [JP 11-311069 A]).

According to the conventional production method of multiple pane described above, in the finished product, the evacuation pipe becomes short, and thus the multiple pane can be easy in handling. External force directly acting on the evacuation pipe can be suppressed, and thus it is possible to prevent an unwanted situation where the reduced pressure state cannot be maintained due to breakage of the evacuation pipe. Therefore, the conventional production method can give advantageous effects to an extent.

However, for example, in the techniques disclosed in patent literature 1, it is necessary to form a recess in the glass panel and fix the evacuation pipe inside the recess in order to reduce an amount of part of the evacuation pipe protruding from the surface of the glass panel. Further, the shield disposed so that the temperature of the junction of the evacuation pipe and the glass plate becomes high at the time of sealing the evacuation pipe is necessary. Thus, the production process of multiple pane becomes more complex. Additionally, according to the technique disclosed in patent literature 2, it is necessary to add the cover member, and this causes an increase in the number of parts. Further, it is necessary to add a step of attaching the cover member to the rear surface, and this causes an increase in the number of steps. When the production process becomes more complex and the numbers of parts and steps increase, the production cost of the multiple pane tends to increase. Further, in the multiple panes formed by use of the above conventional techniques, the evacuation pipe still remains in the finished product. Hence, such a protrusion from the rear surface of the multiple pane is present and therefore there is a problem of appearance, it is very difficult to perfectly eliminate a risk in which the space formed by the pair of glass panels cannot be kept in the reduced pressure state when the evacuation pipe is broken.

SUMMARY

In view of the above circumstances, the present invention has aimed to propose a production method of multiple panes which can be simple and nevertheless produce a multiple pane in its finished state which does not include any undesired protrusion from an external surface of a glass panel.

The production method of multiple panes of the present disclosure includes: hermetically bonding, with a hermetically-bonding member, peripheries of paired glass panels disposed facing each other at a predetermined distance to form a space to be hermetically enclosed between the glass panels; evacuating air from the space through an outlet to make the space be in a reduced-pressure state; subsequently dividing the space by at least one region forming member disposed inside the space to form at least one partial region which does not include the outlet; and subsequently cutting out the at least one partial region by cutting the pair of glass panels.

According to the production method of multiple panes of the present disclosure, the space formed between the pair of glass panels hermetically bonded with the hermetically bonding member is made be in the reduced pressure state and subsequently is divided by the region forming member to form the partial region which does not include the outlet, and thereafter the partial region is cut out by cutting the pair of glass panels. Hence, the partial region cut out is used as a multiple glass which includes the space between the glass panels in the reduced pressure state but does not include the protrusion from the outer surface of the glass panel.

DETAILED DESCRIPTION

Figure 1:
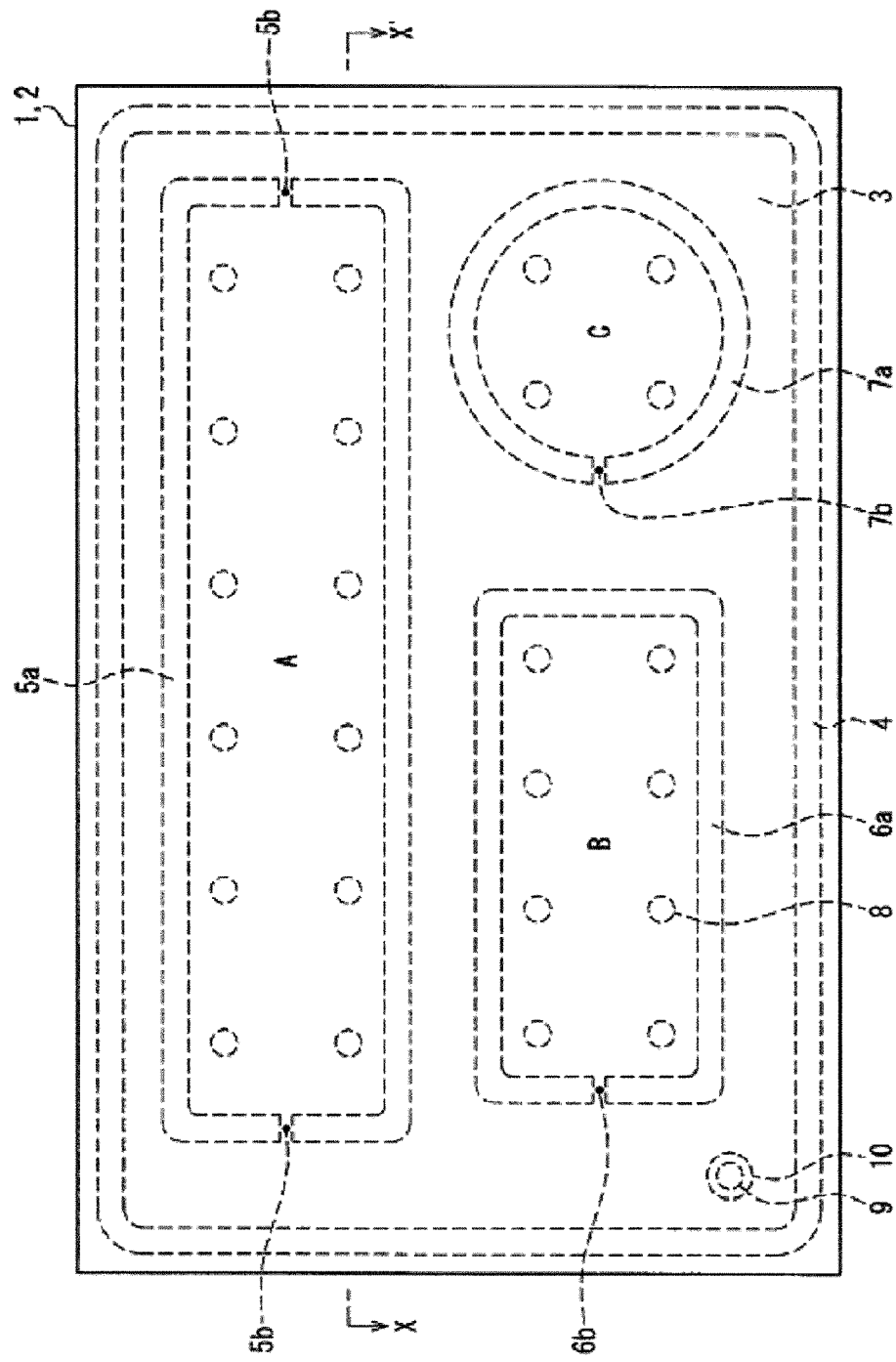
FIG. 1 is a plan which relates to the production method of multiple panes of the first embodiment and illustrates a state in which a hermetically-bonding and a region forming member have not been melted yet.

The production method of multiple panes of the present disclosure includes: hermetically bonding, with a hermetically-bonding member, peripheries of paired glass panels disposed facing each other at a predetermined distance to form a space to be hermetically enclosed between the glass panels; evacuating air from the space through an outlet to make the space be in a reduced-pressure state; subsequently dividing the space by at least one region forming member disposed inside the space to form at least one partial region which does not include the outlet; and subsequently cutting out the at least one partial region by cutting the pair of glass panels.

According to the production method of multiple panes of the present disclosure, the space between the pair of glass panels whose peripheries are hermetically bonded with the hermetically-bonding member is made be in the reduced-pressure state, and thereafter part of the space is separated from the remaining part by the region forming member to form the partial region which does not include the outlet. Subsequently, the partial region is cut out, and this cut out partial region is used as a multiple pane devoid of the evacuation pipe used for evacuation. Consequently, it is possible to easily produce a multiple pane which can keep desired properties such as thermally insulating properties, dew condensation prevention properties, and sound insulating properties and nevertheless does not include any undesired protrusion (e.g., the evacuation pipe) from an external surface of a glass panel.

Note that, in the present description, the phrase that the pressure of the space between the pair of glass panels is reduced means that the space between the pair of glass panels is made be in a state in which the pressure is lower than an outside atmospheric pressure. Further, the reduced-pressure state in the present description means a state in which the pressure of an inside of the space is lower than the outside atmospheric pressure, and thus may include a so-called vacuum state obtained by reducing the pressure by evacuating air from the space, irrespective of the degree of vacuum. Further, a state resulting from evacuating air inside the space and then filling the space with at least one of various gases such as an inert gas is included in the reduced-pressure state of the present description, when the pressure of the gas inside the space is finally lower than the atmospheric pressure.

Further, in a preferable aspect of the production method of multiple panes of the above present disclosure, the at least one region forming member includes at least one air passage interconnecting an inside and an outside of the at least one partial region under a condition where the space is formed; and after the space is made be in the reduced-pressure state, the space is divided by closing the at least one air passage to form the at least one partial region. According to this aspect, it is possible to easily form the partial region devoid of the outlet after the space between the pair of glass panels is made be in the reduced-pressure state.

In this case, the at least one air passage is an interval of the at least one region forming member formed in a discontinuous shape; and after the space is made be in the reduced-pressure state, the interval can be closed by melting the at least one region forming member.

Further, in another preferable aspect of the production method of multiple panes of the above present disclosure, a formation height of the at least one region forming member before being melted is less than a formation height of the hermetically-bonding member before being melted; and after the space is made be in the reduced-pressure state under a condition where the pair of glass panels are hermetically bonded by melting the hermetically-bonding member, the space is divided by the at least one region forming member by decreasing the distance between the pair of glass panels to form the at least one partial region. According to this aspect, it is possible to easily divide the space by adjusting the distance between the pair of glass panels to form the partial region.

Further, in another preferable aspect, a melting-temperature of the at least one region forming member is higher than a melting-temperature of the hermetically-bonding member; the space is formed by hermetically bonding the pair of glass panels at a temperature causing melting of the hermetically-bonding member to form the space; and after the space is made be in the reduced-pressure state, the space is divided by melting the at least one region forming member at a temperature causing melting of the at least one region forming member to form the at least one partial region. According to this aspect, it is possible to easily divide the partial region from the space by adjusting the melting temperatures of the region forming member and the hermetically-bonding member.

Further, in another preferable aspect, after the space is formed by conducting melting inside a furnace to melt the hermetically-bonding member, and subsequently the space is made be in the reduced-pressure state outside the furnace, the space is divided by conducting again melting inside the furnace to melt the at least one region forming member to form the at least one partial region. According to this aspect, the step of evacuating the space formed between the glass panels can be conducted at a lower temperature than the steps of melting the hermetically-bonding member and the region forming member. Therefore, the space can be evacuated to be in the reduced-pressure state by use of inexpensive and simple equipment.

Further, in another preferable aspect, the outlet is formed in at least one of the pair of glass panels. According to this aspect, it is possible to easily connect the evacuation pipe to the outlet, and the multiple pane can be produced by use of manufacture equipment capable of reducing the pressure of the space through the evacuation pipe.

Further, in another preferable aspect, the hermetically-bonding member and the at least one region forming member is made from glass frit. The glass frit is generally used as seal for forming a hermetically enclosed space by melting the seal by heat, and consequently, the multiple pane can be produced at a lowered cost.

Further, in another preferable aspect, a spacer for keeping a gap between the pair of glass panels is disposed on a surface of at least one of the pair of glass panels. According to this aspect, it is possible to accurately keep the gap between the pair of glass panels and to produce a multiple pane with high resistance to external impacts.

Further, in another preferable aspect, a height keeping member for keeping a gap between the pair of glass panels is disposed at a portion on which the hermetically-bonding member is to be formed. According to this aspect, even at the peripheries at which the hermetically-bonding member is formed, the length of the gap between the pair of glass panels can be kept to a predetermined length.

Further, in another preferable aspect, at least one of the spacer and the height keeping member is formed by photolithography. By using the photolithography, the spacer or the height keeping member having a predetermined shape can be disposed accurately at a predetermined position.

Hereinafter, the method of producing multiple panes of the present disclosure is described with reference to the drawings.

Note that, for convenience of explanation, the drawings referred below relate to the production method of multiple panes of the present disclosure and the multiple pane produced by the method of the present disclosure, and illustrate in a simplified manner mainly portions necessary for describing the disclosure. Therefore, the multiple panes described with reference to the drawings may have any configuration which is not shown in the drawings referred. Furthermore, dimensions of members shown in the drawings do not necessarily reflect dimensions and dimensional ratios of members in practice, exactly.

First Embodiment

Figure 2:
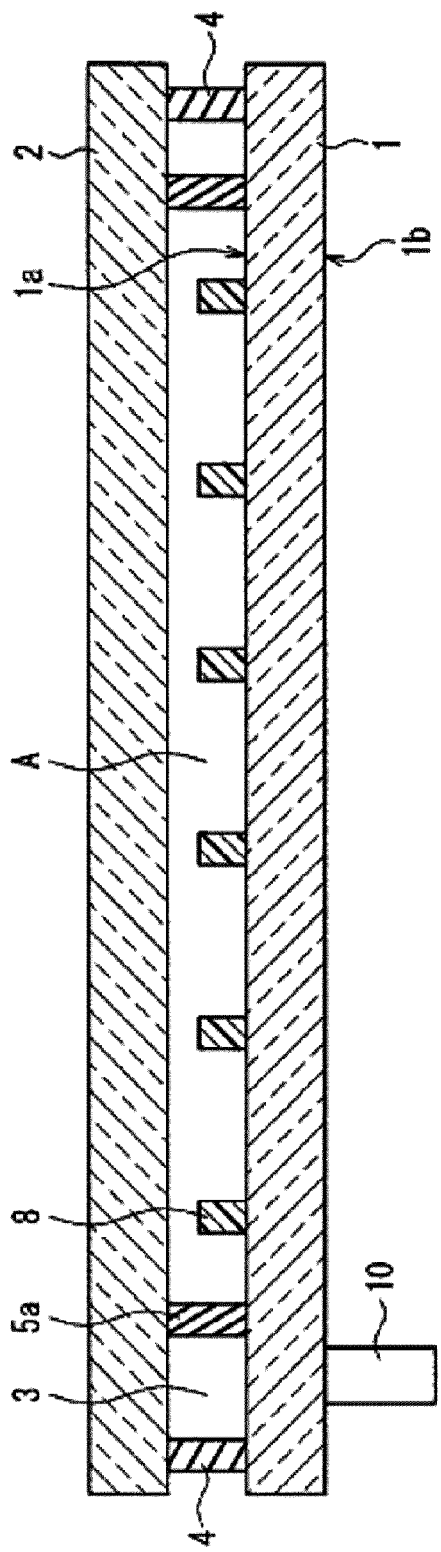
FIG. 2 is a section which relates to the production method of multiple panes of the first embodiment and illustrates the state in which the hermetically-bonding member and the region forming member have not been melted yet.

FIG. 1 and FIG. 2 are diagrams for illustrating the first example of the production method of multiple panes of the present embodiment.

FIG. 1 is a plan illustrating a state where a pair of glass panels disposed facing each other have not been yet hermetically bonded with a hermetically bonding member in the production method of multiple panes of the present embodiment. Further, FIG. 2 is a section illustrating the state where the pair of glass panels disposed facing each other have not been yet hermetically bonded with the hermetically bonding member in the production method of multiple panes of the present embodiment. FIG. 2 shows a section taken along the line X-X' in FIG. 1.

As shown in FIG. 1 and FIG. 2, in the production method of multiple panes according to the present embodiment, a pair of glass panels are arranged facing each other at a predetermined interval, and one of the pair of glass panels is a rear glass panel 1 has a front surface 1a which is a surface facing a front glass panel 2 which is the other of the pair of glass panels, and frit seal 4 is applied on a peripheral part of the front surface 1a in a frame shape to serve the hermetically-bonding member.

In the production method of multiple panes of the present disclosure, the peripheries of the rear glass panel 1 and the front glass panel 2 which are the pair of glass panels disposed facing each other are hermetically bonded with the frit seal 4 serving as the hermetically-bonding member, and thereby a space 3 to be hermetically enclosed is formed between the glass panel 1 and the glass panel 2.

Note that, to keep a distance between the glass panel 1 and the glass panel 2 to a predetermined distance, spacers 8 are arranged regularly inside a region, on which the frit seal 4 is applied, of the rear glass panel 2.

In a vicinity of a corner of the rear glass panel 1, an outlet 9 penetrating through the glass panel 1 is formed. Further, an evacuation pipe 10 is provided to a rear surface 1b of the glass panel 1 to be connected to the outlet 9. Note that, in the production method of multiple panes described in the text relating to the present embodiment, by way of one example, the evacuation pipe 10 is an evacuation pipe made of glass, and the evacuation pipe 10 has an inner diameter equal to a diameter of the outlet 9. The evacuation pipe 10 is connected to the outlet 9 by a conventional method such as glass welding and a method using molten metal used as welding material. Note that, the evacuation pipe 10 may be the aforementioned glass pipe or a metal pipe.

The glass panel used in the multiple pane used for explanation of the production method of the present embodiment may be selected from various glass panels made of soda-lime glass, high-strain glass, chemically toughened glass, non-alkali glass, quartz glass, Neoceram, physically toughened glass, and the like. Note that, in the present embodiment, examples of the glass panel 1 and the glass panel 2 have the same shape and thickness. However, such glass panels may have different sizes and thicknesses. Further, the glass panel can be selected in accordance with its application from glass panels with various sizes including a glass panel which is several cm on a side and a glass panel which is in a range of about 2 to 3 m on a side at maximum. Additionally, the glass panel can be selected in accordance with its application from glass panels with various sizes including a glass panel with a thickness in a range of about 2 to 3 mm and a glass panel with a thickness of about 20 mm.

On the front surface 1a of the glass panel 1, partitions serving as region forming members for forming partial regions are formed together with the frit seal 4. In more detail, to form multiple panes by cutting out in the final step, the partition 5a for forming the partial region A, the partition 6a for forming the partial region B, and the partition 7a for forming the partial region C are formed at respective predetermined positions.

In the present embodiment, the same low-melting frit glass is used for the frit seal 4 hermetically bonding the peripheries of the pair of glass panels 1 and 2 and the partitions 5a, 6a, and 7a.

In more detail, by way of one example, it is possible to use a bismuth-based seal frit paste including: 70% or more of $Bi_2O_3$, 5 to 15% of each of $B_2O_3$ and ZnO; 20 to 30% of zinc-silica oxide; and 5 to 15% of a mixture of organic substances such as ethylcellulose, terpineol, and polyisoutyl methacrylate. This frit glass has a softening point of 434° C.

Note that, the frit glass used for the frit seal 4 and the partitions 5a, 6a, and 7a may be selected from lead-based frit and vanadium-based frit in addition to the bismuth-based frit. Further, seal made of low-melting metal or resin may be used for the hermetically-bonding member and the region forming member as an alternative to the frit glass.

In a state where the frit seal 4 and the partitions 5a, 6a, and 7a have not been melted yet, slit 5b, 6b, and 7b serving as air passages are formed to penetrate through the partitions 5a, 6a, and 7a, respectively, and the partitions 5a, 6a, and 7a are discontinuous at parts where the slits 5b, 6b, and 7b are formed, respectively. In other words, in the space 3 formed by the glass panels 1 and 2 and the frit seal 4, regional parts respectively to be the partial regions A, B, and C are interconnected through the slits 5b, 6b, and 7b formed in the partitions 5a, 6a, and 7a, and thus form a continuous space. Note that, as shown in FIG. 1, the slits 5b are formed in central parts of left and right sides of the partition 5a for forming the region A elongated laterally.

A plurality of spacers 8 are arranged in lengthwise and width directions at regular intervals on parts of the front surface 2a of the glass panel 2 which corresponds to the partial regions A, B, and C inside the partitions 5a, 6a, and 7a. For example, each of the spacers 8 included in the multiple pane of the present embodiment has a cylindrical shape with a diameter of 1 mm and a height of 100 μm. The shape of the spacer is not limited to the above cylindrical shape and may be selected from various types of shapes such as a prism shape and a spherical shape. Further, the size of the spacer is not limited to the aforementioned instance, and may be appropriately selected in accordance with the size and thickness of the glass panel to be used.

The arrangement patterns and intervals of the spacers 8 are appropriately selected depending on the shapes and sizes of the partial regions A, B, and C. Therefore, the arrangement patterns and the arrangement interval may be different for each partial region, and additionally the shape and the size of the spacer 8 may be different for each of the partial regions A, B, and C. Further, the spacers 8 arranged in the same partial region need not be same, and various types of spacers may be used in one partial region.

Further, in the production method of the present embodiment, the spacer 8 is made of photo-curable resin by photolithography before the frit seal 4 is applied on the front surface 1a of the glass panel 1, and in this photolithography, photo-curable resin is applied on the entire front surface 1a to form a film with a predetermined thickness, and thereafter the film is exposed to light with a mask so as to cure intend parts of the film to form the spacers 8, and then undesired part of the film is removed by washing. By using the photolithography in this manner, the spacers with the predetermined size and section can be disposed at the predetermined positions accurately. Note that, when the spacers 8 are made of transparent photo-curable resin, the spacers 8 can be less likely to be visually perceived when the multiple pane 1 is used.

The material of the spacer 8 is not limited to the aforementioned photo-curable resin, and may be selected from various materials which are not melted in a heating process described later. Further, instead of using the photolithography, spacers made of material such as metal can be dispersedly fixed or bonded at predetermined positions in the front surface 1a of the glass panel 1 on the rear side in a similar manner to a conventional multiple pane. Note that, when the formation and arrangement of the spacers are conducted without using the photolithography, it is preferable that the spacers be in a spherical or cuboidal shape. In this case, even when the spacers disposed on the surface of the glass panel are unintendedly directed in different directions, it is possible to accurately set the distance between the pair of glass panels.

Note that, the multiple pane produced by the production method of the present disclosure need not necessarily include the spacer, and may be devoid of the spacer. Further, the spacer may be formed on a surface of the glass panel on the front side facing inside.

As shown in FIG. 2, when the frit seal 4 and the partitions 5a, 6a, and 7a have not been melted yet, the frit seal 4 and the partitions 5a, 6a, and 7a are formed to be taller than the spacer 8. For this reason, the glass panel 2 on the front side is disposed on the tops of the frit seal 4 and the partitions 5a, 6a, and 7a, and gaps are formed between the glass panel 2 and the tops of the spacers 8.

Figure 3:
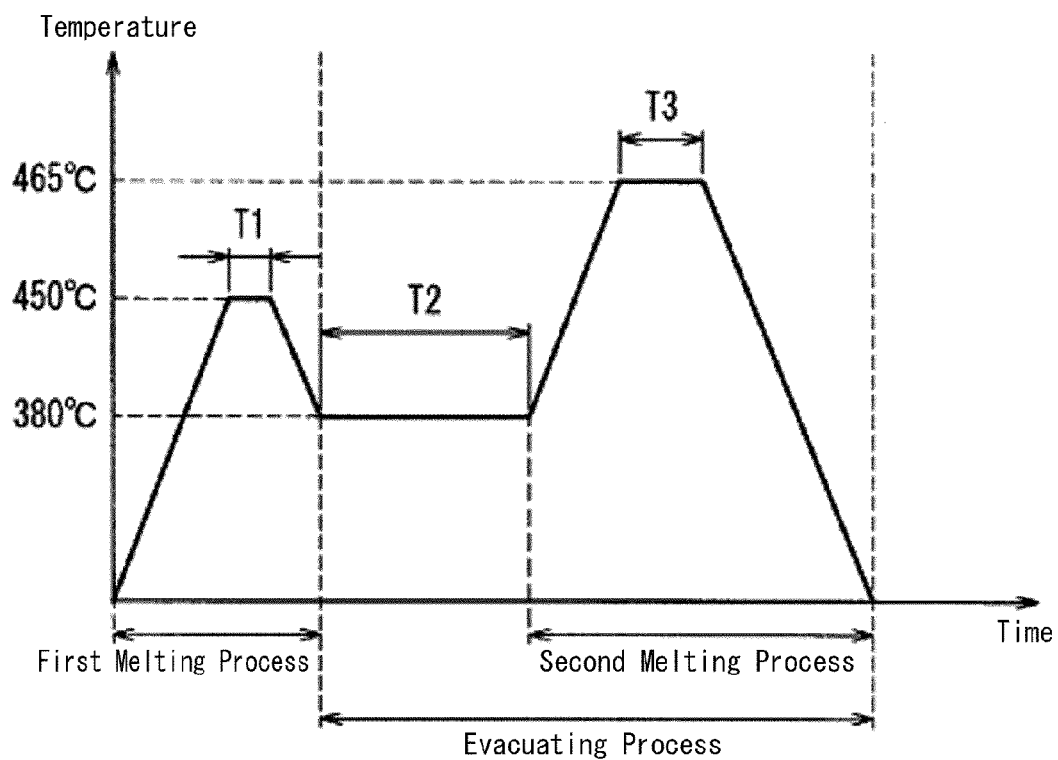
FIG. 3 is a diagram illustrating examples of configuration conditions of a fusing process and an evacuating process in the production method of multiple panes of the first embodiment.

FIG. 3 is a diagram illustrating examples of configuration conditions of a melting process of melting the frit seal 4 and the partitions 5a, 6a, and 7a and an evacuating process of evacuating air from the space 3 between the pair of glass panels 1 and 2 in the production method of multiple panes of the present embodiment.

As shown in FIG. 3, in the first melting process, first a desired temperature of a furnace is set to a temperature (e.g., 450° C.) higher than a softening point temperature of 434° C. of the glass frit used for the frit seal 4 and the partitions 5a, 6a, and 7a. In this process, the frit seal 4 starts to melt, and thus the peripheries of the pair of glass panels 1 and 2 are hermetically bonded, and thereby the space 3 to be hermetically enclosed is formed between the pair of glass panels 1 and 2. Simultaneously, the partitions 5a, 6a, and 7a also start to melt, and thus the partitions 5a, 6a, and 7a formed in the partitions 5a, 6a, and 7a are welded to the glass panel 1 and the glass panel 2. However, the furnace temperature in the first melting process is set to a temperature of 450° C. which is slightly higher than the softening point temperature of the glass frit, and therefore the partitions 5a, 6a, and 7a are not greatly changed in shape, and thus the slits 5b, 6b, and 7b have not been closed yet. In the first melting process, it is important that the slits 5b, 6b, and 7b formed in the partitions 5a, 6a, and 7a have not been closed yet. Hence, the furnace temperature is kept at the maximum temperature of 450° C. in the first melting process, and a continuous period (required period) of melting is set to an extent that the slits 5b, 6b, and 7b of the partitions 5a, 6a, and 7a are not closed. In the present embodiment, the continuous period (T1) in this first melting process is 10 minutes, for example.

Subsequently, as shown in FIG. 3, the evacuating process begins. In the evacuating process, the temperature inside the furnace is temporarily decreased down to a temperature (e.g., 380° C.) equal to or less than the melting-point temperature of 434° C. of the glass frit and simultaneously air is evacuated from the space 3 with a vacuum pump through the outlet 9 and the connected evacuation pipe 10. During the evacuating process, the temperature inside the furnace is set to be lower than the softening point temperature, and thus the frit seal 4 and the partitions 5a, 6a, and 7a are not melted and changed in shape.

In view of ensuring the thermally insulating properties necessary for the multiple pane, it is preferable that the degree of vacuum of the space 3 be equal to or less than 0.1 Pa. The thermally insulating properties of the multiple pane increase with an increase in the degree of vacuum. However, to obtain the higher degree of vacuum, it is necessary to improve the performance of the vacuum pump and increase the evacuation period, and this may cause an increase in the production cost. Hence, in view of the production cost, it is preferable that the degree of vacuum be kept to a level sufficient to ensure the properties necessary for the multiple pane and be not increased more than necessary.

Note that, when the desired temperature in the evacuating process is lowered intentionally, it takes time to increase the temperature to a temperature for the second melting process described later. Hence, in view of shortening a necessary period for the whole of the melting process and the evacuating process, it is effective to set the desired temperature at the time of starting the evacuating process to a temperature slightly lower than the softening point temperature of the glass frit. For example, when the desired temperature of the evacuating process is 420° C. and the continuous period (T2) is 120 minutes, the space inside the multiple pane can be evacuated effectively.

Next, as shown in FIG. 3, while the space 3 is evacuated, the temperature of the furnace is increased up to 465° C. for the second melting process. When the evacuation of the space 3 continues, the atmospheric pressure may cause external force narrowing the gap between the pair of glass panels 1 and 2 and consequently, the glass panel 1 and the glass panel 2 are pressed so that the distance therebetween is decreased. In the multiple pane produced by the present embodiment, by way of example, the spacers 8 with the height of 100 μm are disposed, and thus the distance between the pair of glass panels 1 and 2 is kept equal to the height of 100 μm of the spacers 8. The force causing a decrease in the distance between the glass panels 1 and 2 occurs, and therefore the frit seal 4 and the partitions 5a, 6a, and 7a which are melted are pressed from above and below. Therefore, in a plan view, the widths of the frit seal 4 and the partitions 5a, 6a, and 7a are increased. Hence, the pair of glass panels 1 and 2 are hermetically bonded firmly and successfully with the frit seal 4, and the slits 5b, 6b, and 7b formed in the partitions 5a, 6a, and 7a as the air passages are narrowed and thus closed. When the slits 5b, 6b, and 7b of the partitions 5a, 6a, and 7a are closed, the space 3 is divided, and thereby the partial regions A, B, and C which each do not include the outlet 9 and are hermetically enclosed are formed. Note that, in the second melting process, mechanical pressing force may be applied to at least one of the glass panels to decrease the distance between the glass panels, if necessary.

In the second melting process, it is important that as described above, the partitions 5a, 6a, and 7a are sufficiently melted and thus the slits 5b, 6b, and 7b serving as the air passages are successfully closed. By way of on example, when the continuous period (T3) at the desired temperature of 465° C. in the second melting process is 30 minutes, it is possible to successfully divide by the partitions 5a, 6a, and 7a the space 3 into the partial regions A, B, and C.

Figure 4:
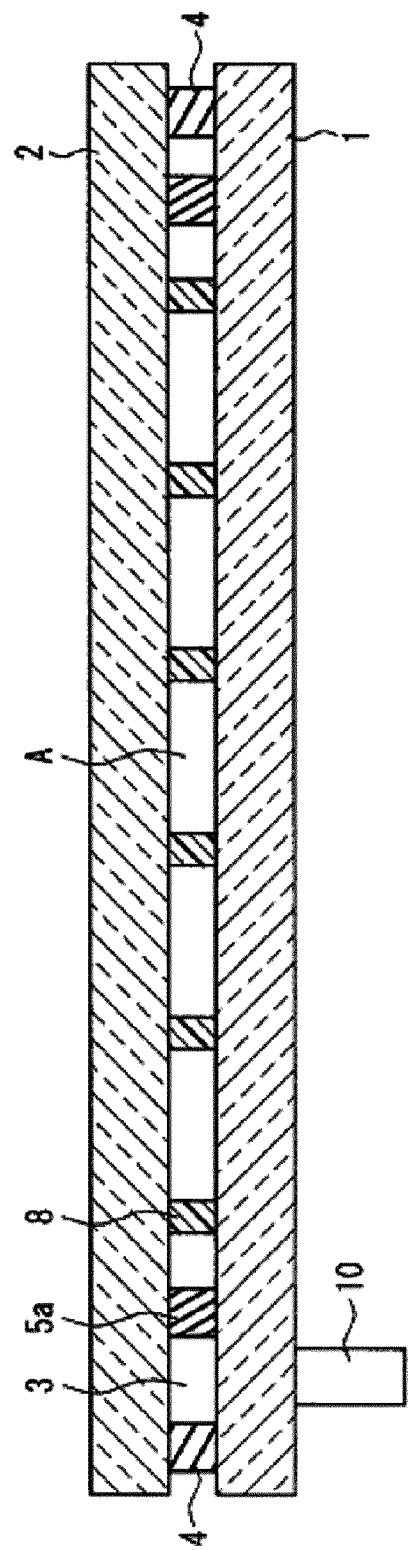
FIG. 4 is a section which relates to the production method of multiple panes of the first embodiment and illustrates a state in which a space between paired glass panels is divided by the region forming member.

As shown in the section of FIG. 4, the distance between the glass panel 1 and the glass panel 2 is set to the predetermined distance determined by the spacer 8, and the slits 5b, 6b, and 7b of the partitions 5a, 6a, and 7a are wholly closed and thus the space 3 is divided and the partial regions A, B, and C are formed. Subsequently, temperature of the furnace is decreased and then the pair of glass panels 1 and 2 whose peripheries are hermetically bonded with the frit 4 is taken out from the furnace.

As described above, the space 3 is made be in the reduced-pressure state by evacuating air from the space 3 formed between the pair of glass panels 1 and 2 through the outlet 9 of the glass panel 1 and the evacuation pipe 10, and subsequently the space 3 is divided by the partitions 5a, 6a, and 7a to form the partial regions A, B, and C. Hence, in the state shown in FIG. 4, the partial region A as well as the partial regions B and C are kept in the reduced-pressure state. Note that, in this state shown in FIG. 4, the evacuation pipe 10 is disconnected from the vacuum pump, and therefore a surrounding region of the space 3, which is other than the partial regions A, B, and C has the atmospheric pressure as with the outside.

Figure 5:
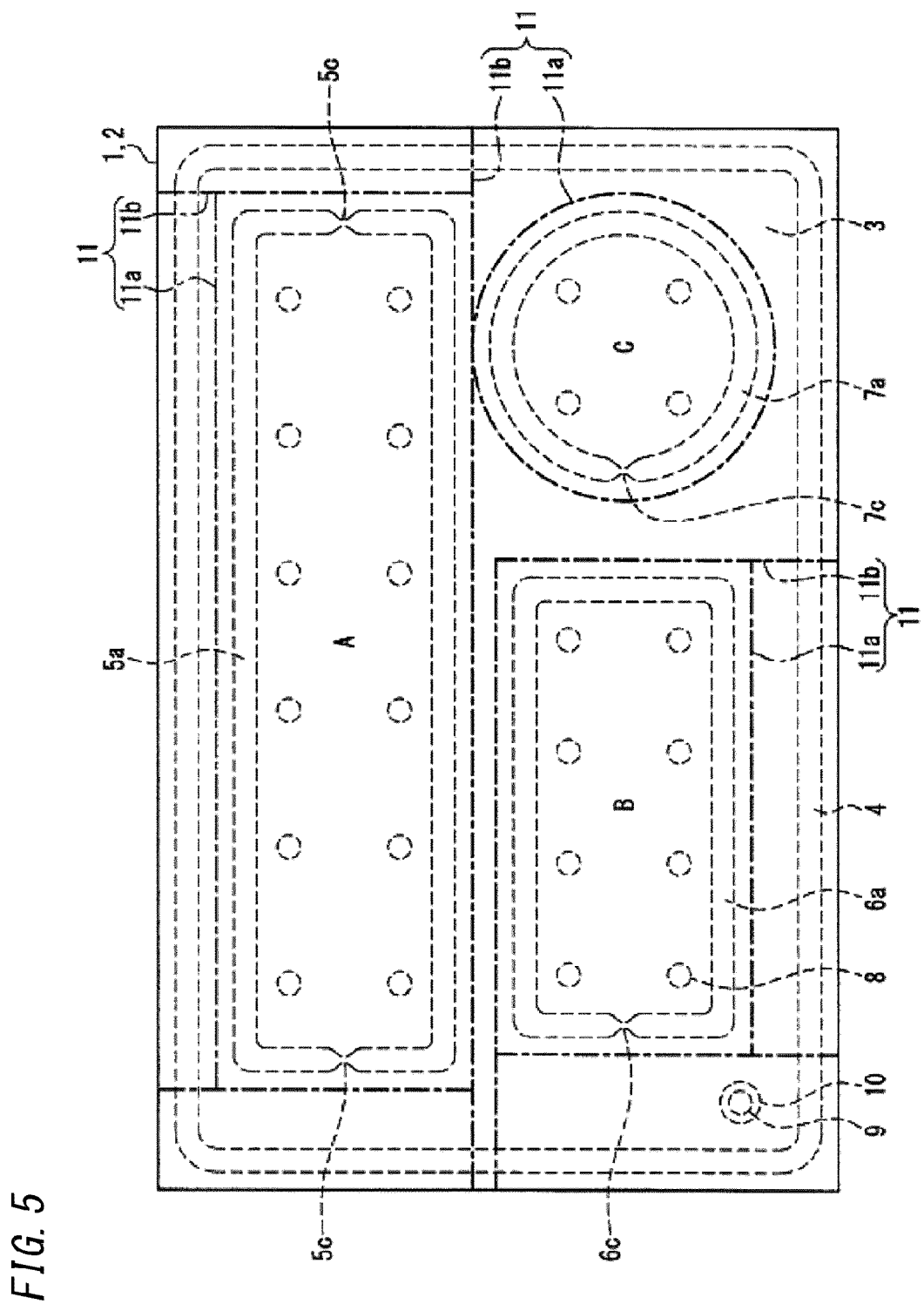
FIG. 5 is a plan illustrating a process of cutting out the partial regions from the pair of glass panels in the production method of multiple panes of the first embodiment.

Next, as shown in FIG. 5, the pair of glass panels 1 and 2 is cut along a cutting line 11. The cutting line 11 includes: outer shape defining lines 11a which surround the peripheries of the partial regions A, B, and C and define outer limits of multiple panes obtained by cutting out the partial regions A, B, and C; and introduction lines 11b connecting the sides of the pair of glass panels 1 and 2 to the outer shape defining lines 11a.

Figure 13:
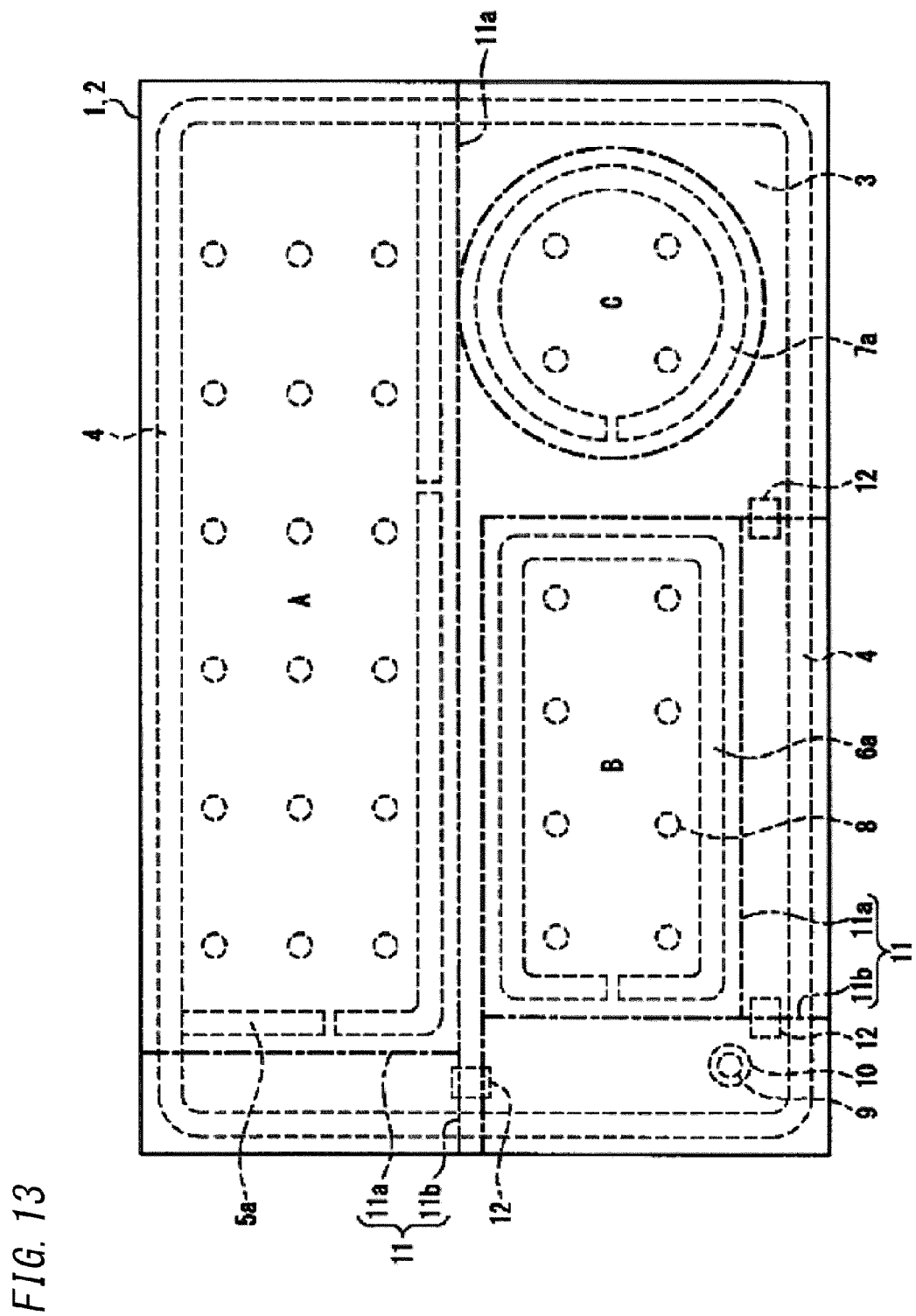
FIG. 13 is a plan illustrating an applied example of the method of forming partial regions and a state in which cutting support in the production method of multiple panes of the present disclosure.

When cutting supports described later with reference to FIG. 13 are not used, cutting of the glass panels may be conducted by water jet cutting or laser cutting as an alternative to a method using glass cutter, the cut part of the glass panel is hollow, and hence to ensure cutting of the glass panels, it is preferable to use water jet cutting or laser cutting in many cases. Note that, after the glass panels are cut by any cutting method, it is more preferable to conduct a polishing process to smooth cut surfaces.

Figure 6:
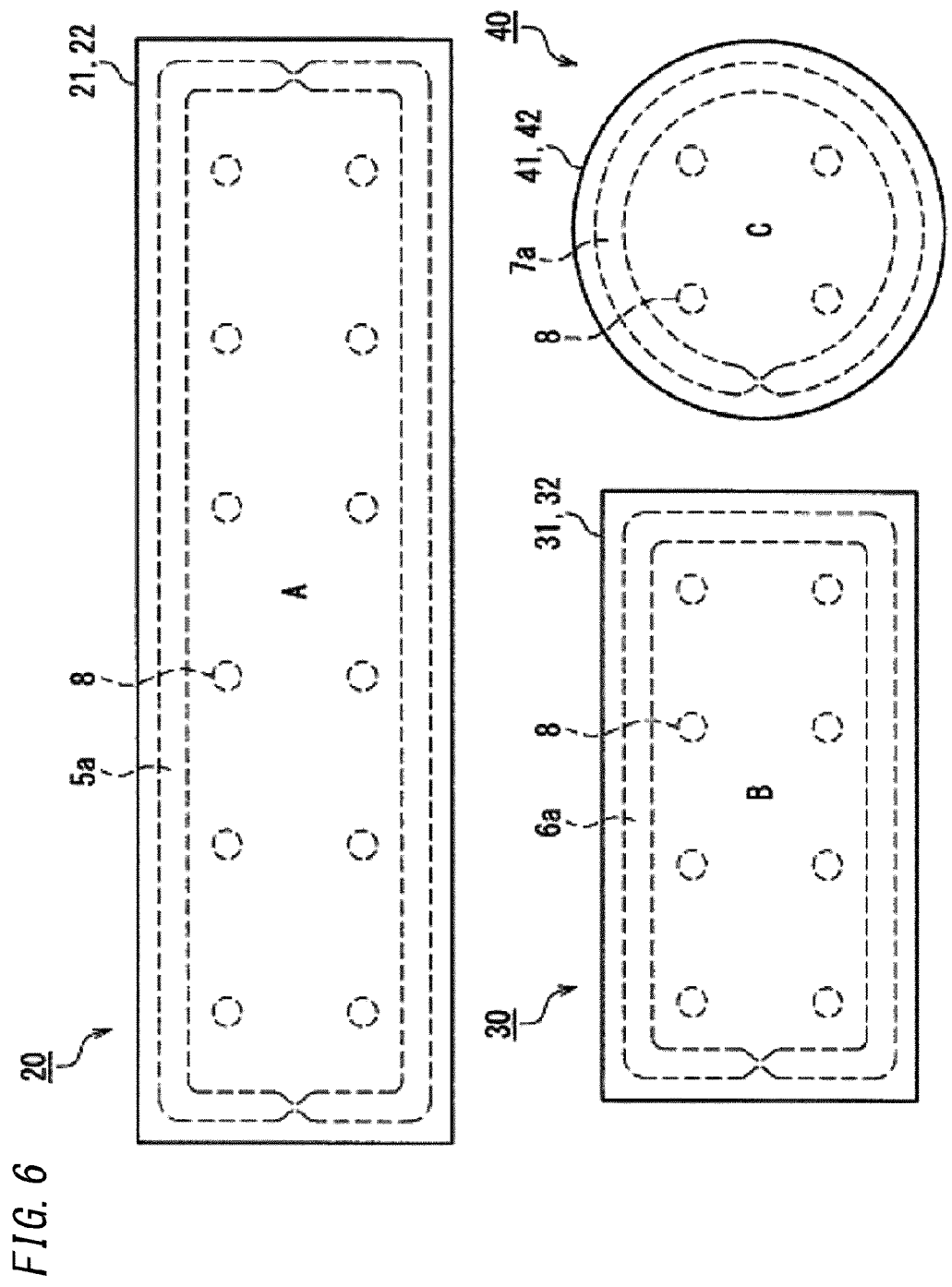
FIG. 6 is a plan illustrating the multiple panes obtained by cutting out.

FIG. 6 shows a state in which the partial regions A, B, and C are separated by cutting along the cutting liens 11 shown in FIG. 5.

According to the production method of multiple panes of the present embodiment, the partial regions A, B, and C cut out in the aforementioned manner are used as finished products of multiple panes. In more detail, the partial region A which is cut out defines a multiple pane 20 including a glass panel 21 cut out from the glass panel 1, a glass panel 22 cut out from the glass panel 2, and the partition 5*a* hermetically bonding peripheries of the glass panels 21 and 22. Similarly, the partial region B which is cut out defines a multiple pane 30 including a glass panel 31 cut out from the glass panel 1, a glass panel 32 cut out from the glass panel 2, and the partition 6*a* hermetically bonding peripheries of the glass panels 31 and 32. The partial region C which is cut out defines a multiple pane 40 including a glass panel 41 cut out from the glass panel 1, a glass panel 42 cut out from the glass panel 2, and the partition 7*a* hermetically bonding peripheries of the glass panels 41 and 42. Each of the multiple panes 20, 30, and 40 formed in this manner has a predetermined outer shape, and includes a space between its pair of glass panels arranged at an interval defined by its spacer 8 which is made be in the reduced-pressure state. Further, it is obvious that each of the multiple panes 20, 30, and 40 does not include the evacuation pipe.

Figure 7:
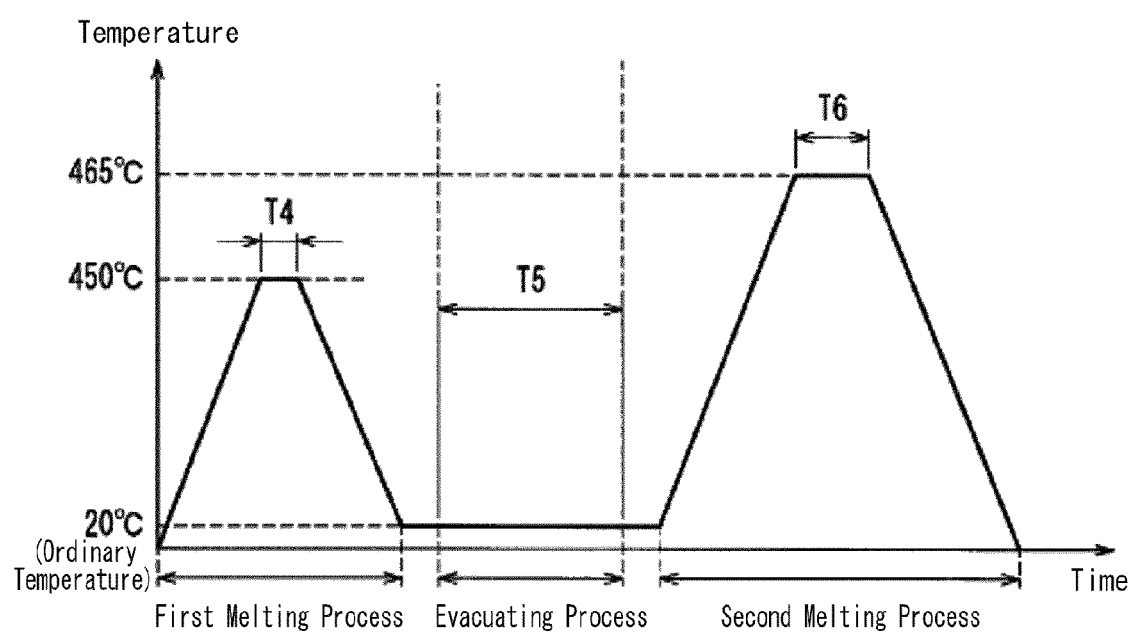
FIG. 7 is a diagram illustrating other examples of the configuration conditions of the fusing process and the evacuating process in the production method of multiple panes of the first embodiment.

FIG. 7 shows other configuration conditions of the first melting process of hermetically bonding the pair of glass panels 1 and 2 with the frit seal 4, the evacuating process of making the space 3 formed inside 3 be in the reduced-pressure state, and the second melting process of forming the partial regions A, B, and C by dividing the space 3 by closing the slits 5*b*, 6*b*, and 7*b* serving as the air passages by melting the partitions 5*a*, 6*a*, and 7*a*. The configuration conditions shown in FIG. 7 are different from the configuration conditions shown in FIG. 3 in that the temperature of the multiple pane is decreased down to the room temperature after the first melting process.

First, the first melting process of melting the frit seal 4 to hermetically bond the pair of glass panels 1 and 2 so as to form the space 3 is performed. The configuration condition of the first melting process can be same as that shown in FIG. 3, and thus the maximum achieving temperature is 450° C. higher than the softening point temperature 434° C. of the glass frit used for the frit seal 4 and the partitions 5*a*, 6*a*, and 7*a* and the continuous period (T4) is 10 minutes, by way of one example. Subsequently, the temperature of the pair of hermetically bonded glass panels 1 and 2 is decreased down to the room temperature by taking out the pair of hermetically bonded glass panels 1 and 2 from the furnace or the like.

Thereafter, at the room temperature, the evacuating process of evacuating air from the space 3 through the evacuation pipe 10 with the vacuum pump to obtain the space 3 with the predetermined degree of vacuum is conducted. The desired period (T5) in the evacuating process is 300 minutes, for example.

In the other configuration condition example shown in FIG. 7, at the end of the evacuation process, under a condition where the degree of vacuum of the space 3 is a predetermined value such as 0.1 Pa or less, sealing the tip of the evacuation pipe 10 to enclose the space 3, so called tip-off is conducted. By doing so, even when the pair of glass panels 1 and 2 in which the space 3 formed by the pair of glass panels has the predetermined degree of vacuum is detached from the vacuum pump, the space 3 can be kept in the reduced-pressure state.

After the evacuating process, the pair of glass panels 1 and 2 in which the evacuation pipe 10 has been subjected to the tip-off is placed inside the furnace again, and the second melting process of the maximum temperature of 465° C. and the continuous period (T6) of 30 minutes is conducted, by way of one example. In the other configuration conditions shown in FIG. 7, the condition of the temperature of the furnace may be same as the temperature condition shown in FIG. 3, but in the second melting process, the evacuation of the space 3 is not conducted. As described above, in the case of the configuration condition example shown in FIG. 7, the evacuation is not conducted in the second melting process, however, since the evacuating process conducted at the room temperature, the space 3 in the reduced-pressure state has the pressure lower than the outside pressure. Hence, the external force is applied so as to decrease the distance between the pair of glass panels 1 and 2. As a result, like the configuration conditions show in FIG. 3, in the second melting process, the frit seal 4 is sufficiently melted and thus the glass panels 1 and 2 are hermetically bonded firmly, and the slits 5*b*, 6*b*, and 7*b* of the partitions 5*a*, 6*a*, and 7*a* are closed, and consequently the space 3 is divided and thereby the partial regions A, B, and C is formed.

Note that, when the melting process and the evacuating process under the other configuration conditions shown in FIG. 7 are conducted, the tip of the evacuation pipe 10 is subjected to the tip-off. Hence, even when the evacuation pipe 10 is detached from the vacuum pump after the end of the second melting process, a region of the space 3 corresponding to the surrounding part other than the partial regions A, B, and C is kept in the reduced-pressure state. Hence, it is preferable that the partial regions are cut out by cutting along the cutting lines shown in FIG. 5 after the surrounding region inside the space 3 is made be in the atmospheric pressure state by removing the evacuation pipe or the like.

As described above, according to the production method using the other configuration conditions shown in FIG. 7, between the first melting process and the second melting process, the evacuating process is conducted under a condition where the temperature of the multiple pane is set to the room temperature. Hence, the melting process and the evacuating process can be conducted independently, and thus the furnace used in the melting process can be separate from the vacuum pump used in the evacuating process. As a result, the furnace can be simplified and downsized, and therefore the degree of sealing of the furnace can be improved, it is possible to reduce the necessary power consumption and shorten time necessary for increasing the temperature. Further, the vacuum pump can be disposed at a position far from the furnace having a high temperature, and hence there is no need to take action to prevent equipment for chucking a vacuum valve of the vacuum pump and/or the evacuation pipe from having high temperature, and therefore the production equipment can be simplified.

In contrast, in the second melting process, the space 3 is not being evacuated, and thus the external force causing a decrease in the distance between the pair of glass panels is weaker than that in the case of the configuration conditions shown in FIG. 3. Therefore, it is necessary to carefully control application status and viscosity of the glass frit for the frit seal 4 and the partitions 5*a*, 6*a*, and 7*a* so that after the second melting process the distance between the pair of glass panels 1 and 2 becomes the predetermined distance and the slits 5*b*, 6*b*, and 7*b* of the partitions 5*a*, 6*a*, and 7*a* are closed to successfully divide the partial regions A, B, and C from the space 3. Further, it is considered that mechanical pressing force may be applied to at least one of the glass panels to keep the distance between the glass panels to the predetermined distance, if necessary.

As described above, according to the production method of multiple panes of the present embodiment, the slits 5b, 6b, and 7b serving as the air passages are provided to the partitions 5a, 6a, and 7a, and the slits 5b, 6b, and 7b are closed in the second melting process, and thereby the space 3 formed between the pair of glass panels is divided, and consequently the partial regions A, B, and C can be formed. By cutting out the individual partial regions, the multiple panes with desired shapes and devoid of the evacuation pipe can be obtained.

Note that, in the above example of the present embodiment, the number of slits 5b provided to one partial region is two, and each of the number of slits 6b and the number of 7b provided to one partial region is one. However, when the slits 5b, 6b, 7b serving as the air passages are formed in the partition, the position of the slit, the number of slits, and the like may be appropriately selected. Note that, to evacuate the partial regions efficiently, it is preferable that the slit be formed in a side of the partial region close to the outlet 9. Further, when the partial region has an elongated shape like the region A, in view of evacuation efficiency, it is preferable that a plurality of slits 5b be formed at opposite positions as shown in the figure.

Note that, in the present embodiment, the air passage formed in the partition is not limited to the slit shown in FIG. 1.

Figure 8:
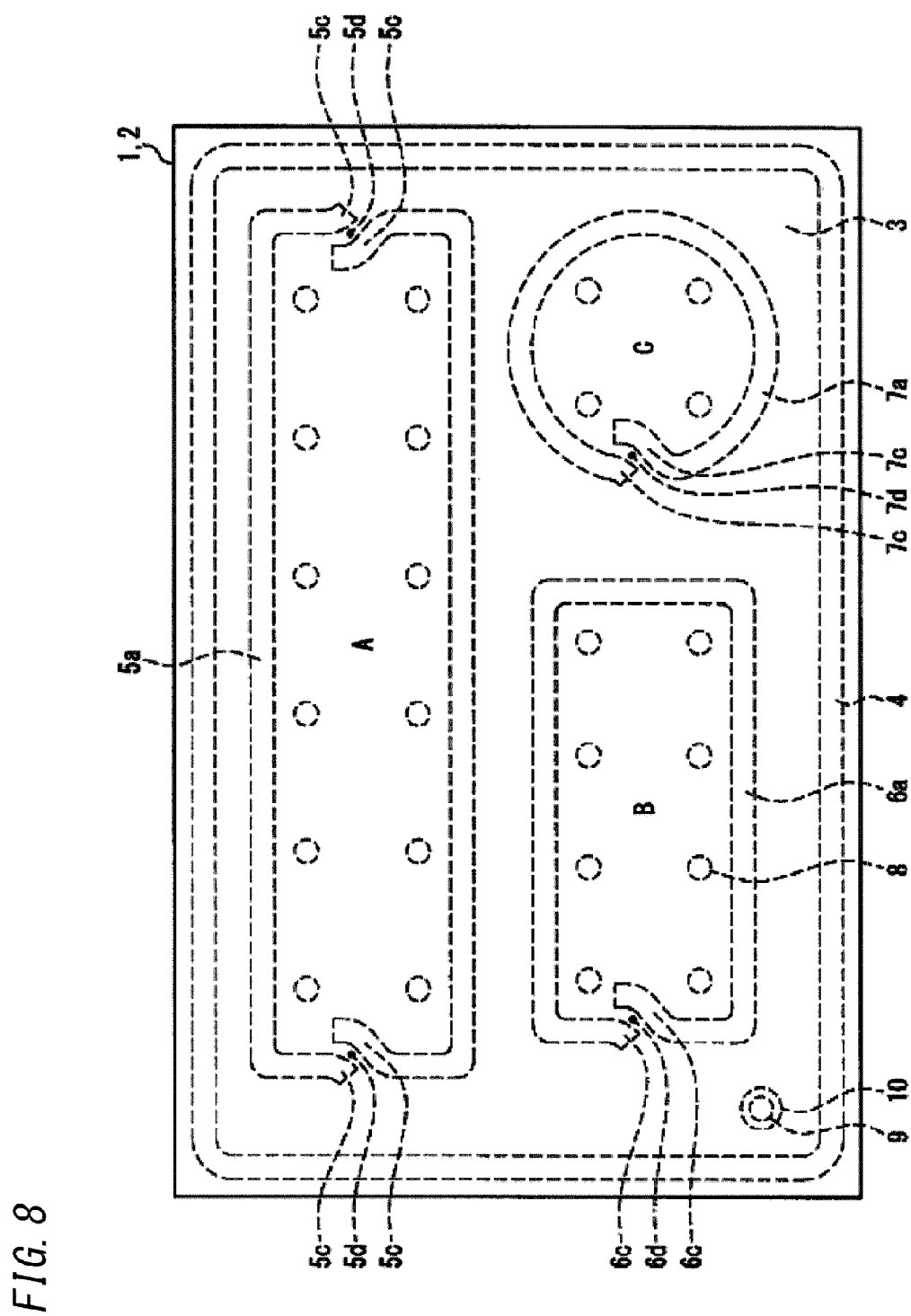
FIG. 8 is a plan illustrating the first modification of the region forming member in the production method of multiple panes of the first embodiment.

FIG. 8 is a plan illustrating a structure of the partition of the first modification as a configuration example of the partition provided with an air passage different from the slit.

With regard to the partitions 5a, 6a, and 7a of the first modification shown in FIG. 8, opposite ends of the partition 5a are curved in different directions to form opposite curved parts 5c, and opposite ends of the partition 6a are curved in different directions to form opposite curved parts 6c, and opposite ends of the partition 7a are curved in different directions to form opposite curved parts 7c. Consequently, a gap 5d between the curved parts 5c serves as an air passage interconnecting the inside and the outside of the partial region A in the space 3, and a gap 6d between the curved parts 6c serves as an air passage interconnecting the inside and the outside of the partial region B in the space 3, and a gap 7d between the curved parts 7c serves as an air passage interconnecting the inside and the outside of the partial region C in the space 3.

The partitions 5a, 6a, and 7a are made of seal such as low-melting glass frit. The seal can be applied to the predetermined position in the surface 1a of the glass panel 1 facing the inside by controlling a position of an application nozzle which to discharge a paste of the seal from its tip. Hence, to form the slits 5b, 6b, and 7b with the predetermined width which are intervals in the partitions 5a, 6a, and 7a formed continuously as shown in the planar configuration of FIG. 1, the nozzle is moved the predetermined distance while the discharge of the seal from the nozzle is tentatively stopped, and thereafter the discharge of the seal from the nozzle is started again. However, in some cases, it is difficult to accurately form the discontinuous partition including the slit with the predetermined width due to some limitations such as the viscosity of the paste and the application width of the partition. In contrast, according to the partitions 5a, 6a, and 7a of the modification shown in FIG. 8, opposite ends of the partitions 5a, 6a, and 7a are curved in different directions to form the opposite curved parts 5c, 6c, and 7c so that the gaps 5d, 6d, and 7d with the predetermined widths are formed between the opposite curved parts 5c, 6c, and 7c, and the gaps 5d, 6d, and 7d are used as the air passages. Therefore, the control of the application positions of the partitions 5a, 6a, and 7a by the nozzle can be facilitated, and hence there is an advantage that the partitions 5a, 6a, and 7a with the desired shapes can be formed accurately.

Note that, lengths of the curved parts 5c, 6c, and 7c of applied glass frit and widths of the gaps 5d, 6d, and 7d may be appropriately selected in consideration of the viscosity and application height of the glass frit and the widths of the partitions 5a, 6a, and 7a in the pressed and flattened state in the second melting process of melting the partitions to close the air passages. Further, the opposite ends of each of the partitions 5a, 6a, and 7a need not be necessarily curved. For example, the opposite ends may be formed as straight portions extending in different directions, and at least parts of the straight portions are arranged in substantially parallel at a predetermined distance. In summary, it is possible to use various configurations in which the partition 5a, 6a, 7a formed continuously includes parts arranged at the predetermined distance, and the interval between the parts serves as the air passage to be closed when the partition 5a, 6a, 7a are flattened by pressing in the second melting process.

Figure 9:
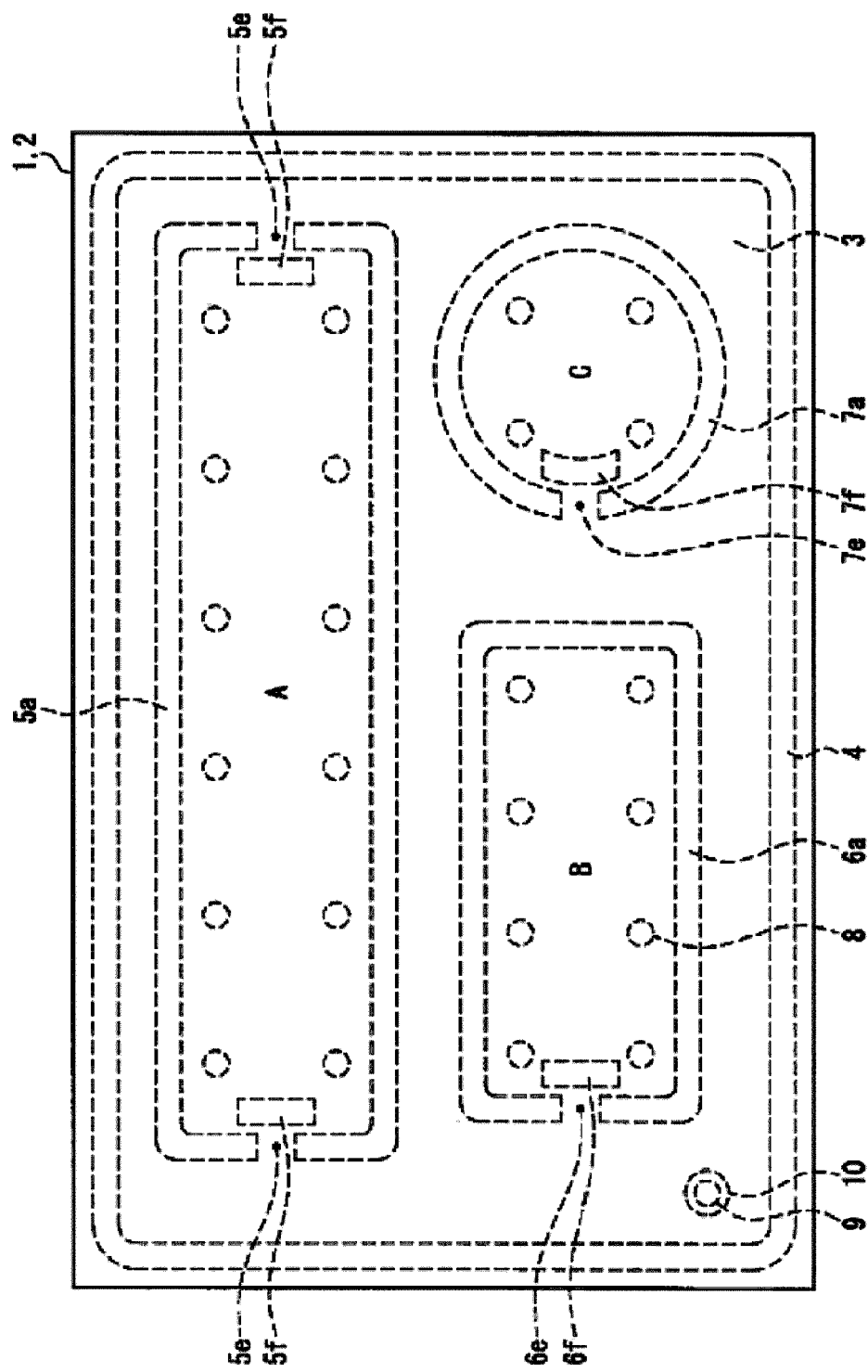
FIG. 9 is a plan illustrating the second modification of the region forming member in the production method of multiple panes of the first embodiment.

FIG. 9 is a plan illustrating the partition of the second modification as another configuration example of the partition provided with the air passage.

The partitions 5a, 6a, and 7a of the second modification shown in FIG. 9 include: relatively large intervals 5e, 6e, and 7e; and sealing parts 5f, 6f, and 7f which are formed inside the corresponding partial regions and adjacent to the intervals 5e, 6e, and 7e and are longer than the intervals 5e, 6e, and 7e, respectively.

The partitions 5a, 6a, and 7a of the second modification shown in FIG. 9 include at their central parts the intervals 5e, 6e, and 7e with predetermined lengths greater than the widths of the slits 5b, 6b, and 7b of the partitions 5a, 6a, and 7a shown in FIG. 1, respectively. By way of one example, as shown in FIG. 9, the lengths of the intervals 5e, 6e, and 7e may be greater than the application widths of the partitions 5a, 6a, and 7a, respectively.

In the partitions 5a, 6a, and 7a shown in FIG. 9, the intervals 5e, 6e, and 7e formed in the central parts are formed to have lengths greater than the widths of the slits 5b, 6b, and 7b shown in FIG. 1, respectively, and the sealing parts 5f, 6f, and 7f for closing the intervals 5e, 6e, and 7e are disposed in vicinities of the intervals 5e, 6e, and 7e, respectively. The accuracy necessary for the lengths of the intervals 5e, 6e, and 7e is not so high. Hence, even when the application formation process of the partitions 5a, 6a, and 7a is simplified more than a process of forming the slits 5b, 6b, and 7b shown in FIG. 1, it is possible to form the partitions 5a, 6a, and 7a including the air passages allowing successful division of the space 3 to form the partial regions A, B, and C which are hermetically enclosed.

Note that, with regard to the partitions 5a, 6a, and 7a of the second modification shown in FIG. 9, the lengths of the intervals 5e, 6e, and 7e, the lengths of the sealing parts 5f, 6f, and 7f, and the distance between the intervals 5e, 6e, and 7e and the sealing parts 5f, 6f, and 7f may be appropriately selected in consideration of material, an application and formation method, and an application height of seal for forming the partitions 5a, 6a, and 7a, the temperature conditions of the second melting process, and the finished width of the partitions 5a, 6a, and 7a flattened by pressing in the second melting process.

Figure 10:
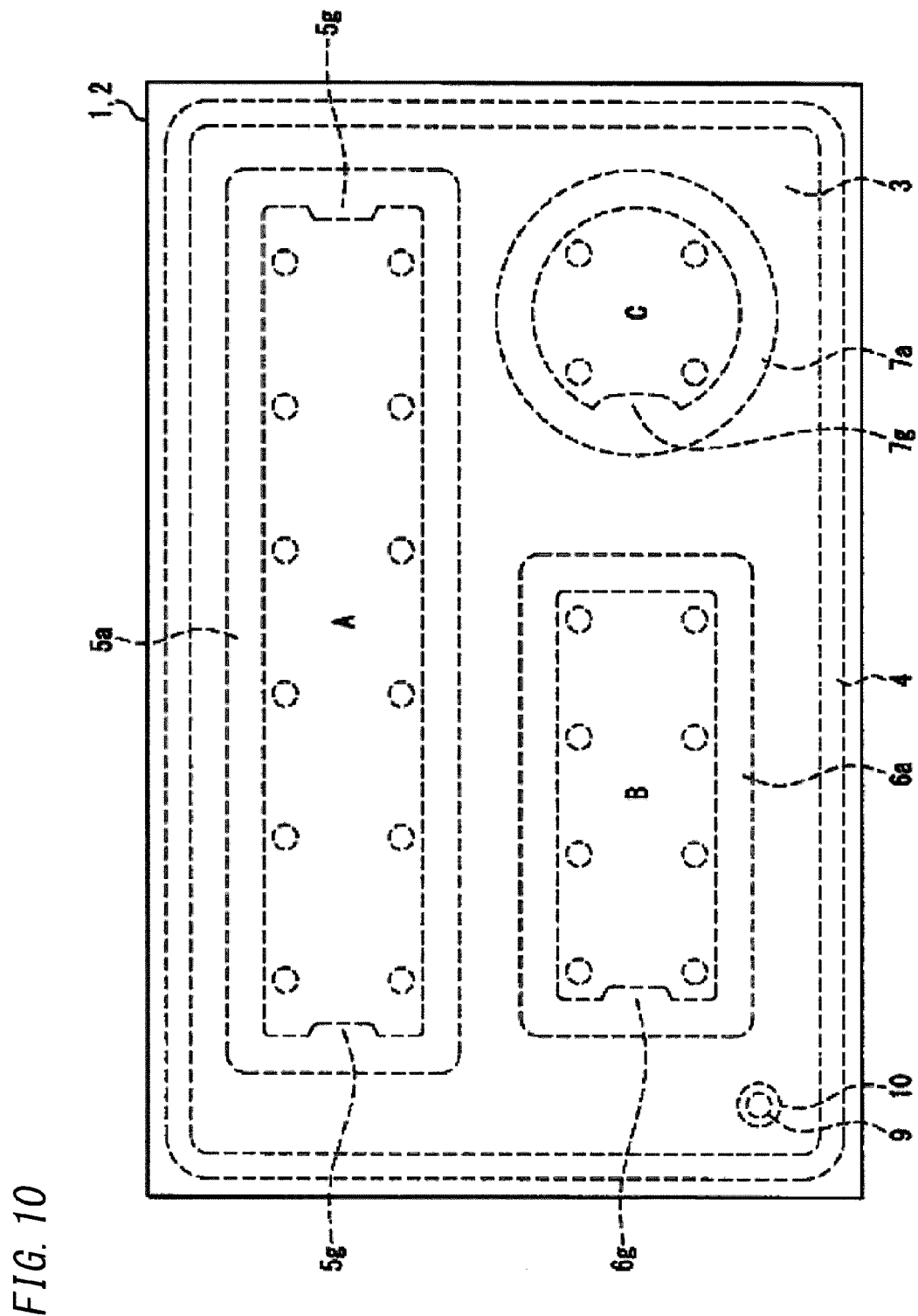
FIG. 10 is a plan illustrating a state where the partial regions are formed with regard to a case including the modification of the region forming member in the production method of multiple panes of the first embodiment.

Further, in the case of using the partition of the first modification shown in FIG. 8 or the partition of the second modification shown in FIG. 9, when the air passage formed in the petition is closed, the partition is wider at its part resulting from the closure of the air passage than at the remaining part. When the width of the partition is increased more than necessary, the partition can be easily perceived when the finished product of the multiple pane is viewed. Further, according to the production method of multiple panes of the present embodiment, the partial region is hermetically enclosed and subsequently is cut out by cutting along the cutting line surrounding the partial region. Hence, as shown in FIG. 10, when the partitions 5a, 6a, and 7a are flattened by pressing, the partitions 5a, 6a, and 7a preferably extend toward the insides of the partial regions A, B, and C. For this reason, it is preferable that the shape and width of parts 5g, 6g, and 7g of the partitions 5a, 6a, and 7a in which the air passages are closed are sufficiently controlled.

As described above, the production method of multiple panes according to the first embodiment of the present disclosure is described with reference to the instance where the frit seal serving as the hermetically-bonding member and the partition serving as the region forming member are made by use of the same low-melting glass frit.

However, in the production method of multiple panes of the present embodiment, the frit seal and the partition are not limited to being made of the same glass frit. For example, the partition serving as the region forming member may be made by using glass frit with a melting temperature higher than a melting temperature of the frit seal serving as the hermetically-bonding member, for example. In more detail, the glass frit used for the frit seal and the glass frit used for the partition have different melting temperatures, and further the heating temperature in the first melting process of melting the frit seal to hermetically bond the pair of glass panel is set to a temperature which is equal to or more than the melting temperature of the frit seal and is equal to or less than the melting temperature of the partition, and the heating temperature in the second melting process of melting the partition to divide the space between the pair of glass panels to form the partial region is set to a temperature which is more than the melting temperature of the partition. By doing so, it is possible to clearly distinguish by the temperature conditions the first melting process of melting the frit seal to form the predetermined space between the pair of glass panels from the second melting process of melting the partition to close the air passage to form the hermetically enclosed partial region.

Alternatively, the hermetically-bonding member and the region forming member may be made of seals which are other than glass frit and have different melting conditions. As with this case, the hermetically-bonding member and the region forming member are made of seals to be melted under different conditions, and only the hermetically-bonding member is melted in the first melting process and only the region forming member is melted in the second melting process. Therefore, it is possible to avoid unexpected situations where the region forming member is unfortunately melted in the first melting process, and the air passage is narrowed and thus the evacuation efficiency for the space is likely to decrease, and in the worst-case the air passage is closed in the first melting process and thus the partial region cannot have a sufficiently reduced pressure.

Note that, when each of the frit seal serving as the hermetically-bonding member and the partition serving as the region forming member is made of low-melting glass frit, the melting temperature of the glass frit can be adjusted by components, sizes, and contents of glass powder used for the glass frit and metal power contained in the glass frit, and/or adjusting concentration and content of a resin component used as a solvent.

Second Embodiment

The method of producing multiple panes of the second embodiment of the present disclosure is described with reference to the drawings.

The production method of multiple panes according to the second embodiment is different from the production method of multiple panes of the aforementioned first embodiment in that a formation height of a frit seal 4 serving as a hermetically-bonding member formed on a surface 1a of a rear glass panel 1 facing an inside is higher than a formation height of a partition serving as a region forming member. Note that, in the following text relating to the present embodiment, components common to the present embodiment and the first embodiment are designated by the same reference signs, and detailed explanations thereof may be omitted.

Figure 11:
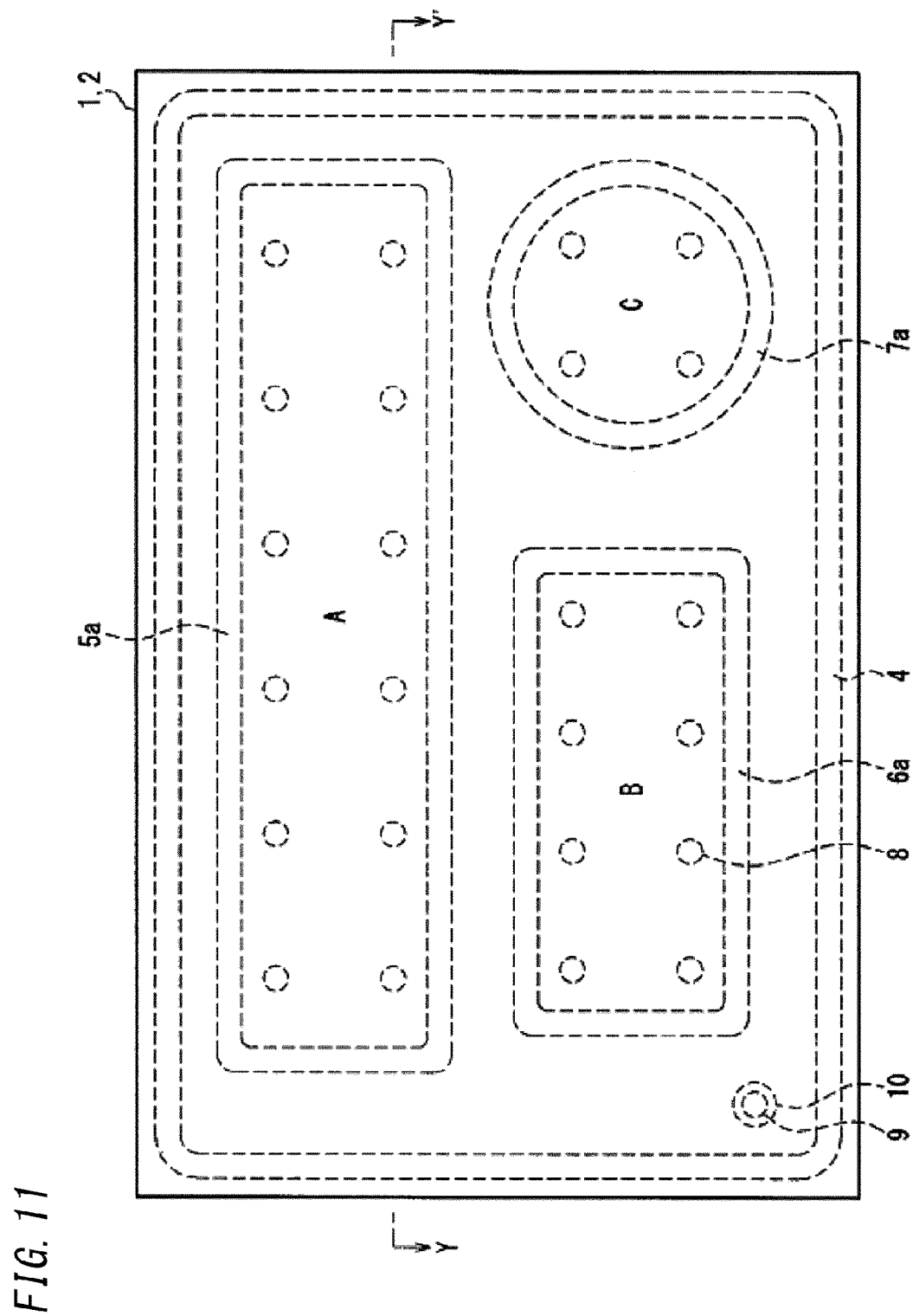
FIG. 11 is a plan which relates to the production method of multiple panes of the second embodiment and illustrates a state in which a hermetically-bonding member and a region forming member have not been melted yet.
Figure 12:
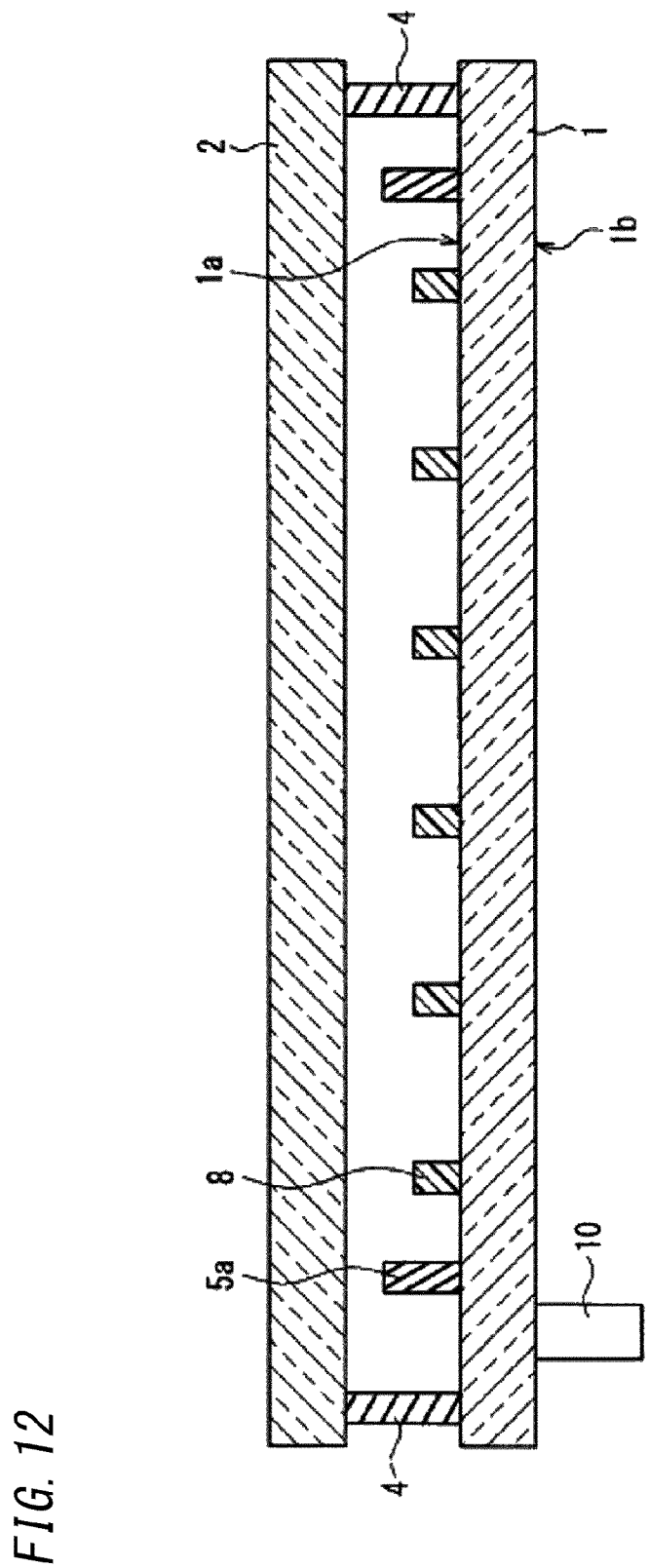
FIG. 12 is a section which relates to the production method of multiple panes of the second embodiment and illustrates the state in which the hermetically-bonding member and the region forming member have not been melted yet.

FIG. 11 and FIG. 12 are diagrams for describing the production method for the multiple pane of the second embodiment. FIG. 11 is a plan illustrating a state in which the rear glass panel 1 and the front glass panel 2 have not been hermetically bonded with the frit seal 4 yet. FIG. 12 is a section illustrating a state in which the rear glass panel 1 and the front glass panel 2 have not been hermetically bonded with the frit seal 4 yet. FIG. 12 is a view illustrating a sectional structure taken along line Y-Y' in FIG. 11. FIG. 11 is similar to FIG. 1 relating to the first embodiment. FIG. 12 is similar to FIG. 2 relating to the first embodiment.

As shown in FIG. 11 and FIG. 12, in the production method of multiple panes of the present embodiment, the frit seal 4 in a frame shape serving as the hermetically-bonding member is applied on a peripheral portion of a front surface 1a of the rear glass panel 1, which is a surface facing the front glass panel 2. Further, the outlet 9 penetrating through the glass panel 1 is formed in a corner of the rear glass panel 1. Additionally, an evacuation pipe 10 is provided to a rear surface 1b of the glass panel 1 to be connected to the outlet 9.

On the front surface 1a of the glass panel 1, partitions serving as region forming members for forming partial regions are formed together with the frit seal 4. In more detail, to form multiple panes by cutting out in the final step, the partition 5a for forming the partial region A, the partition 6a for forming the partial region B, and the partition 7a for forming the partial region C are formed at respective predetermined positions.

In the present embodiment, the same low-melting frit glass is used for the frit seal 4 hermetically bonding the pair of glass panels 1 and 2 and the partitions 5a, 6a, and 7a. However, an application height of the frit seal 4 is 1 mm by way of one example, and application heights of the partitions 5a, 6a, and 7a are 0.5 mm by way of one example, and in short, the application heights of the partitions 5a, 6a, and 7a are smaller than the application height of the frit seal 4.

Note that, in the process of dividing the space between the glass panels 1 and 2 by the partitions 5a, 6a, and 7a described later, the application height of the frit seal 4 and the application heights of the partitions 5a, 6a, and 7a can be appropriately selected to an extent that melting of the frit seal 4 and the partitions 5a, 6a, and 7a can be controlled. However, it is necessary that the application heights of the partitions 5a, 6a, and 7a are greater than the height (e.g., 100 µm=0.1 mm) of the spacer 8 arranged at predetermined intervals on the surface 1a of the glass panel 1 facing the inside. For example, in a case where the frit seal 4 and the partitions 5a, 6a, and 7a are made of material which has relatively high fluidity when melted, the application height and width of the frit seal 4 are 0.5 mm and 5 mm, respectively and the application height and width of each of the partitions 5a, 6a, and 7a are 0.2 mm, and 3 mm, respectively, while the height of the spacer 8 is 0.1 mm. The paste used for forming the frit seal 4 and the partitions 5a, 6a, and 7a may be made of a bismuth-based seal frit paste, which is described in the text relating to the first embodiment, including: 60 to 75% of a glass component which is composed mostly of bismuth oxide and includes 70% or more of $Bi_2O_3$, 5 to 15% of each of $B_2O_3$ and ZnO, and 10% or less of other components; 20 to 30% of zinc-silica oxide; and 5 to 15% of a mixture of organic substances such as ethylcellulose, terpineol, and polyisoutyl methacrylate. This frit glass has a softening point of 434° C.

FIG. 12 shows an assembly where the frit seal 4 and the partitions 5a, 6a, and 7a have not been melted yet, and thus the front glass panel 2 is disposed on the frit seal 4 having the largest application height.

This assembly is subjected to the first melting process in the furnace under the configuration conditions shown in FIG. 3 described in the text relating to the first embodiment, for example. Through the first melting process, the frit seal 4 is melted and thus the glass panel 1 and the glass panel 2 are hermetically bonded. Further, through the first melting process, the frit seal 4 is melted, and thus the height of the frit seal 4 is decreased and the width of the frit seal 4 is increased. Hence, the distance between the front glass panel 2 and the rear glass panel 1 is slightly decreased. However, as described in the text relating to the first embodiment, the maximum achieving temperature in the first melting process is 450° C. which is slightly higher than the melting temperature of 434° C. of the low-melting glass frit for forming the frit seal 4 and the partitions 5a, 6a, and 7a, and therefore changes in shape of the frit seal 4 and the partitions 5a, 6a, and 7a caused by melting are relatively small. Therefore, after the first melting process, a gap between the tops of the partitions 5a, 6a, and 7a and the glass panel 2 caused by a difference in thickness between the frit seal 4 and the partitions 5a, 6a, and 7a has still existed, and thus the space formed between the pair of glass panels has been still one continuous space.

Next, the evacuation process shown in FIG. 3 is conducted, and therefore the space is in a reduced-pressure state in which the degree of vacuum is 0.1 Pa or less. As described above, the gap remains between the glass panel 2 and the tops of the partitions 5a, 6a, and 7a, and therefore the whole of the inside space 3 has the predetermined degree of vacuum.

Thereafter, as shown in FIG. 3, the second melting process having the achieving temperature of 465° C. which is higher than the achieving temperature of the first melting process is conducted. According to this second melting process, the frit seal 4 is further melted. The evacuation of the inside space 3 continues, and therefore intense external force causing a decrease in the distance between the glass panel 2 and the glass panel 1 acts, and consequently, the distance between the glass panels 1 and 2 is decreased until it is equal to the height of the spacer 8. As a result of this second melting process, the partitions 5a, 6a, and 7a are in contact with both the glass panel 1 and the glass panel 2, and therefore the partial regions A, B, and C divided from the space 3 are formed by the partitions 5a, 6a, and 7a. Note that, also in the present embodiment, in the second melting process, mechanical pressing force may be applied to at least one of the glass panels to decrease the distance between the glass panels, if necessary.

The subsequent processes are same as those of the first embodiment. In other words, after the pair of glass panels 1 and 2 hermetically bonded is detached from the vacuum pump and the pair of glass panels 1 and 2 is cut along the cutting lines 11 shown in FIG. 5 to cut out the partial regions A, B, and C. Thereby, the finished products of multiple panes with individual desired shapes can be obtained.

As described above, in the production method of multiple panes of the second embodiment, the application heights of the partitions 5a, 6a, and 7a each serving the region forming member are smaller than the application height of the frit seal 4 serving as the hermetically-bonding member. Therefore, the entire inside space formed between the pair of glass panels 1 and 2 hermetically bonded can be made be in the predetermined reduced-pressure state, and thereafter the partial regions A, B, and C can be formed.

Note that, in the description relating to the above present embodiment, the frit seal 4 and the partitions 5a, 6a, and 7a are made of the same low-melting glass frit, for example. However, also in the present embodiment, the frit seal 4 may be made of material having its melting temperature lower than the melting temperature of the low-melting glass frit for forming the partitions 5a, 6a, and 7a.

Further, in the production method described in the text relating to the present embodiment, to successfully ensure the desired gap between the glass panel 2 and the tops of the partitions 5a, 6a, and 7a, the following method can be used. In this method, at least one stopper for keeping the distance between the glass panel 2 and the glass panel 1 not less than a predetermined value may be disposed outside a region on which the frit seal 4 is applied. The stopper is used in the first melting process to keep the predetermined distance, and thereafter in the second melting process the stopper is removed. Thereby, the distance between the glass panel 2 and the glass panel 1 becomes the predetermined distance determined by the spacer 8.

Further, like the first embodiment, the configuration conditions of the melting process and the evacuating process in the present embodiment may be the other configuration conditions, shown in FIG. 7 with regard to the first embodiment, where the temperature of the hermetically bonding glass is decreased down to the room temperature after the first melting process and then the second melting process is conducted after the evacuating process is conducted outside the furnace, as shown in FIG. 7.

As described above, according to the production method of multiple panes in accordance with the present disclosure, the space formed between the pair of glass panels is made be in the reduced-pressure state, and thereafter the partial region with a desired shape required as a multiple pane can be formed by the region forming member. Therefore, the multiple pane can be produced by a simple production method, and nevertheless the multiple pane obtained by cutting out has the inside space which is kept in the reduced pressure state. Consequently, the multiple pane can have properties (e.g., a thermally insulating effect, a dew condensation prevention effect, and a sound insulating effect) inherent to a multiple pane in which the pressure of the inside space is reduced. Further, the multiple pane does not include a protrusion protruded outside from the glass panel, and consequently a disadvantage caused by the presence of the protruded evacuation pipe at the time of using and transferring the multiple pane can be solved. Further, it is possible to avoid an undesired situation where the whole space between the glass panels of the multiple pane is not in the reduced-pressure state due to breakage of the evacuation pipe.

Particularly, according to the production method of the present embodiment, there is no need to provide an outlet for making the partial region be in the reduced pressure state inside the partial region, and therefore it is possible to effectively use the inside region of the partition for hermetically bonding the peripheries in the finished product of the multiple pane.

Note that, in the examples in the description of the above embodiments, each of the partial regions is formed inside the region surrounded by the hermetically-bonding member, and has the entire periphery surrounded by the region forming member. However, for example, like the partial region A shown in FIG. 13, when the partial region is formed by use of the corners of the pair of glass panels 1 and 2, the periphery of the partial region can be formed by use of both the frit seal 4 serving as the hermetically-bonding member and the partition 5a serving as the region forming member. In this case, it is possible to shorten the cutting lines 11 in the process of cutting out the partial region from the pair of glass panels 1 and 2, and therefore the production method of multiple panes can be simplified.

Further, as described in the texts relating to the above embodiments, the three partial regions with the reduced pressures are formed by use of the partitions. However, the number and shapes of partial regions formed inside the space between the pair of glass panels are not limited to the described examples. Further, with regard to the shape of the air passage formed in the region forming member and the method of closing the air passage in order to form a plurality of partial regions, the texts relating to the above embodiments provide a method of forming the partition with the slit, a method of forming the partition with the interval and the sealing part, and a method of the forming the hermetically bonding member and the region forming member which have different formation heights. Note that in the above texts, the air passages of the region forming members of all of the partial regions are closed by the same method. However, in the production method of multiple panes of the present disclosure, to form a plurality of partial regions from one hermetically enclosed space formed between a pair of glass panels, the partial regions may be formed in different methods selected from the methods described above.

Further, in the process of cutting out the partial region with the inside in the reduced pressure state from the glass panels along the cutting lines, when a part of the glass panels beneath the cutting line 11 is hollow and there is a gap between the glass panels, force curving the glass panel by pressing may act on the glass panel, and consequently undesired breakage of the glass panel may occur. To avoid such undesired breakage of the glass panel, as shown in FIG. 13, a cutting support 12 which is made of material similar to or same as material of the hermetically bonding member or the region forming member may be formed in advance at part of an inside space overlapping with the cutting line 11 (particularly, the introduction line 11b). Note that, as shown in FIG. 13, in view of the evacuation efficiency of the inside space formed by the pair of glass panels and the hermetically-bonding member, it is preferable that the cutting support 12 be formed in an island shape and be disposed so as not to be connected to the hermetically bonding member or the region forming member adjacent to the cutting support 12.

Further, in the description of the embodiments, the hermetically-bonding member and the region forming member are made of material which melts and changes its shape when heated, such as glass frit. However, the hermetically-bonding member and the region forming member may be made of various types of materials which solidify into a predetermined shape in response to stimuli such as rays of light such as ultraviolet rays. In this case, a high temperature process including the first melting process and the second melting process as described in the text relating to the above present embodiment is unnecessary, and production equipment for multiple pane can be greatly simplified.

Further, in the text relating to the aforementioned first embodiment, the air passage formed in the region forming member is exemplified by an air passage making planar separation such as a slit and an interval between parts of the region forming member. However, depending on material of the region forming member and methods of changing in shape and solidifying the material, the air passage may be constituted by a through hole penetrating through the region forming member.

Note that, with regard to the production methods of multiple panes of the first embodiment and the second embodiment, in the examples described with referring to with reference to FIG. 3 and FIG. 7 for the configuration conditions of the melting process and the evacuating process, the temperature of the hermetically bonded glass panels is decreased temporally after the first melting process and then the evacuating process is conducted. However, in the production method of multiple panes of the present disclosure, it is possible to use configuration conditions where after the first melting process, the temperature of the pair of glass panels hermetically bonded is not lowered but is kept or is increased and then the evacuating process is conducted and thereafter the second melting process using higher temperature than the first melting process is conducted. By doing so, it is possible to shorten lead time for the melting process and the evacuating process. Note that, to perform the evacuating process without decreasing the temperature of the hermetically bonded glass panels, it is very important that the partial region formed by dividing the space between the pair of glass panels is made be in a sufficiently reduced pressure state by accurately controlling the timing of closing the air passage formed in the region forming member.

Further, in the production method of multiple panes of the first embodiment and the second embodiment, with regard to a case where the partition serving as the region forming member is made of material with a different melting point from material of the hermetically-bonding member or has a different application height from the frit seal, an example in which part is constituted by the region forming member in the same state except the hermetically-bonding member disposed at the peripheries of the pair of glass panels is described. However, in the production method of multiple panes of the present disclosure, in order to maintain the inside space 3 as one continuous space after completion of the first melting process, the region forming member may be made so that one part of the region forming member is made of material with a different melting point from material of the hermetically-bonding member and the air passage is formed in this part and another part of the region forming member is made of the same material as the hermetically-bonding member. Further, in a similar manner, the region forming member may have one part with a smaller application height than the hermetically-bonding member and another part with the same application height as the hermetically-bonding member. Further, the material and the application height of the region forming member may be different from those of the hermetically-bonding member.

Figure 14:
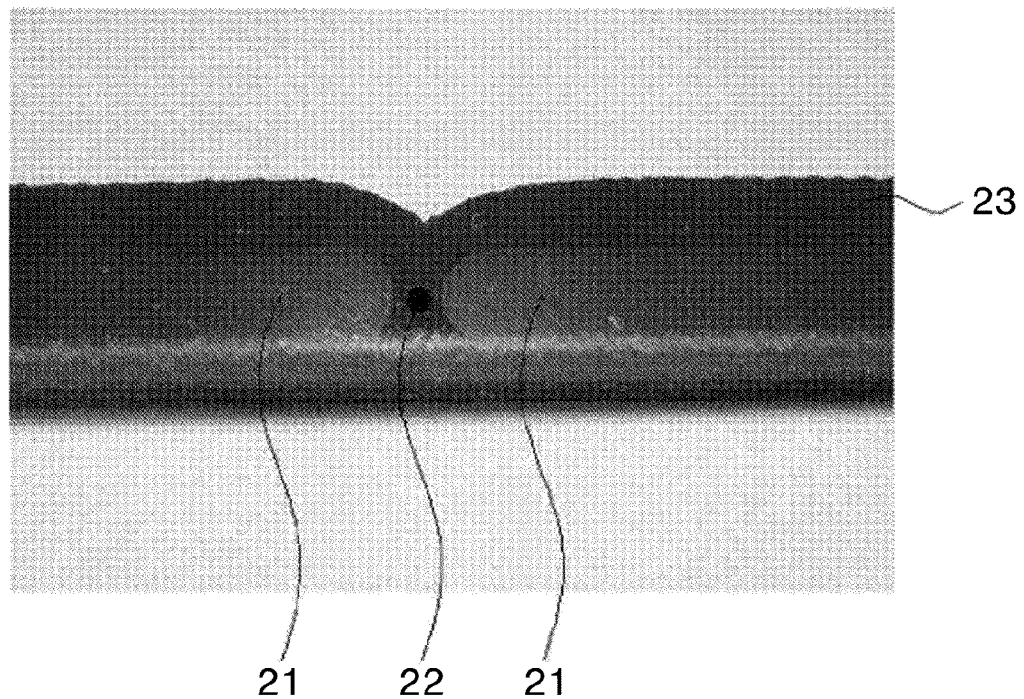
FIG. 14 is a diagram illustrating a difference in appearance between an applied part and a melted and spread part of the region forming member.

FIG. 14 is a diagram illustrating the state of the region forming member of the finished product of the multiple pane produced by the production method according to the present disclosure.

FIG. 14 shows a photograph of a sample low-melting glass frit parts 21 arranged with a slit 22 with a predetermined length in-between are melted in the melting process and thereby slit is closed by melted part 23. In more detail, the low-melting glass frit parts are made of the paste described in the texts relating to the first and second embodiments, the application width is 5 mm, the slit width is 2 mm, and the application height is 0.5 mm. The sample was prepared by subjected to the melting process at 465° C. for 30 minutes in a furnace. Note that, the glass panels are two soda-lime glass panels with a thickness of 3 mm. In the melting process, external force causing a decrease in a distance between the pair of glass panels was not applied. Further, in the sample shown in FIG. 14, to facilitate taking photographs, the glass frit parts 21 with the slit 22 in-between were formed at peripheral regions of the glass panels.

As shown in FIG. 14, after melting of glass frit, the part 21 which is preliminarily formed by application has a relatively light color, and the part 23 which is melted and is solidified has a relatively dark color, and thus it is possible to distinguish the part 21 from the part 23. As a result of check by the present inventors with microscopes, it is acknowledged that the part of low-melting glass preliminarily applied shows a pattern of fine particles whereas the part low-melting glass which was melted and flowed once shows a pattern of fine lines. It is considered that these patterns are formed by glass fine particles and pores contained in the low-melting glass frit paste. Further, it is considered that a difference between these patterns depends on amounts of movement from the original application position. It is considered that such a difference in surface states causes a difference in color which can be observed with naked eyes.

As apparent from the above, with regard to the low-melting glass frit, the part which was preliminarily applied and the part which was once melted and liquefied and again was solidified are in different surface states. Even in the finished product of the multiple pane, the difference between the surface states appears as a difference in color by irradiation with particularly intense light. Further, in a case where the parts of low-melting glass frit have different application heights, such a difference between the parts may appear as a difference in the section of the finished product, and especially appear as a difference in a width of the section or the degree of spread of a portion in contact with the glass panel. Therefore, the multiple pane produced by the production method of multiple panes of the present disclosure does not include the evacuation pipe or the like used for reducing the pressure of the inside space, and additionally a particular part of the hermetically-bonding member hermetically bonding the two glass panels is different in its state from the remaining part. This is because the particular part is not formed by application in advance but is formed later by melting. Hence, the multiple pane produced by the production method of multiple panes of the present disclosure can be identified from multiple panes produced by other methods, based on observation of the state of the hermetically-bonding member for forming the enclosed space.

Further, a method of melting the hermetically-bonding member and the region forming member may include laser sealing of fusing particular parts of the hermetically-bonding member and the region forming member by heating with laser, in addition to a method of placing the whole of glass panels inside the furnace as described in the texts relating to the embodiments, for example. According to a method of fusing particular parts of the hermetically-bonding member and the region forming member by applying predetermined heat from outside by laser sealing or other method, it is easy to selectively melt the hermetically-bonding member and the region forming member at predetermined regions. Hence, it can be expected that melting control in the production process where only the hermetically-bonding member is melted in advance and then the region forming member is melted is successfully conducted. Further, in a case where the hermetically-bonding member is melted and bonded in the furnace and thereafter the inside space is evacuated and then the region forming member is melted by laser sealing so as to divide the inside space into the outlet region and the reduced-pressure region, it is possible to produce multiple pane at a lowered cost and with s simplified device.

Further, in the texts relating to the above embodiments, a method of disposing the spacers on the region surrounded by the hermetically-bonding member to keep the gap between the pair of glass panels is described. Alternatively, height keeping member corresponding to the spacer may be disposed at a region where the hermetically-bonding member is formed.

Figure 15:
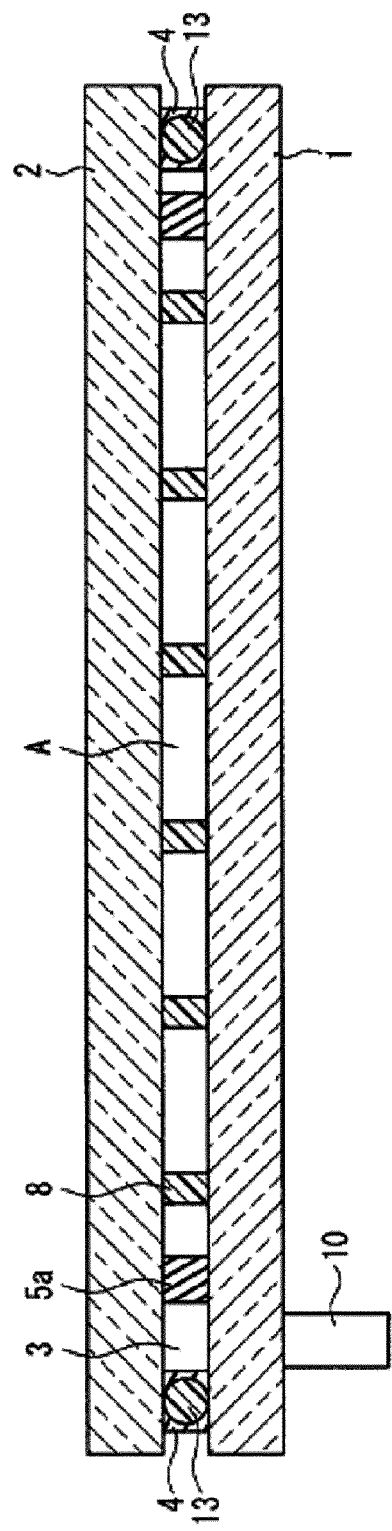
FIG. 15 is a section which relates to a case where a height keeping member is disposed at a portion on which the hermetically-bonding-member is to be formed with regard to the production method of multiple panes of the present disclosure and illustrates a state in which the space between the pair of glass panels is divided by the region forming member to form the partial region.

FIG. 15 relates to a case where glass beads serving as the height keeping member with the same height as the spacer are disposed at a region where the frit seal serving as the hermetically-bonding member is formed, and shows a cross section illustrating a state in which the region forming member is melted and the inside space is divided. Like FIG. 4 used for explanation of the first embodiment, FIG. 14 shows the multiple pane in which the frit seal and the partition is melted perfectly once.

As shown in FIG. 15, with regard to the region where the frit seal 4 is formed, spherical glass beads 13 with a diameter equal to the height of the spacer 8 are disposed. In this case, it is possible to reduce a difference in the distance between the pair of glass panels 1 and 2 between a part at which the spacers 8 are disposed and a peripheral part at which the glass frit 4 is formed. By doing so, it is possible to successfully prevent a curve of the pair of glass panels 1 and 2, and thus residual stresses of the glass panels 1 and 2 can be reduced and the strength of the multiple pane obtained by cutting out can be improved. Further, it is possible to avoid a problem where the distance between the glass panels 1 and 2 becomes smaller than the predetermined distance at the region at which the frit seal 4 is applied, and thus the region forming member formed in a vicinity of the frit seal 4 is pressed and flattened and thereby widened, and consequently the frit seal 4 can be easily perceived by a user, for example.

Note that, as a method of disposing the height keeping member at the region at which the hermetically-bonding member is formed, it is possible to use a method of mixing the glass beads 13 in the paste for application of the frit seal 4, and disposing the glass beads 13 at the same time of applying the frit seal 4. Further, the height keeping members may be disposed in advance at the region at which the frit seal 4 is formed, by a dispersion method similar to the method of disposing the spacers 8 or photolithography at the same time of disposing the spacers, and thereafter the frit seal 4 can be applied to cover the height keeping member.

The height keeping member described in FIG. 15 may be disposed at a region at which the region forming member is formed, instead of the region at which the hermetically-bonding member is formed. By doing so, the height at the periphery of the multiple pane obtained by cutting out is adjusted to the height determined by the spacer. Further, the height keeping member is disposed at the region at which the hermetically-bonding member or the region forming member is formed, and thus differently from the spacers, problem in which the height keeping member is perceived by a user and causes poor appearance of the multiple pane is less likely to occur. Hence, the height keeping member may be cylindrical member with the relatively large area or continuous member with a predetermined length in a peripheral direction of the partial region like the partition. With regard to a method of disposing and forming such a height keeping member with the large area in a plan view, the aforementioned photolithography is preferable. Further, depending on the size of the multiple pane obtained by cutting out and the thickness of the glass panel, it is possible to produce the multiple glass which includes the height keeping member but does not include the spacers.

Further, in the texts relating to the above embodiments, an example in which one outlet formed at a vicinity of a corner of one glass panel is used as the outlet formed in the glass panel is described. However, the number of outlets is not limited to one. For example, in the case of the multiple pane produced by use of the pair of glass panels with the large areas, in view of evacuation efficiency, two or more outlets may be formed in a region other than a part cut out as the partial region.

Further, instead of forming the outlet in the glass panel, a predetermined gap is provided to the hermetically-bonding member formed between the peripheries of the glass panels, and air can be evacuated from the inside space by using this gap as the outlet. Particularly, in the production method of multiple panes of the present disclosure, the space between the pair of glass panels is divided by the region forming member to form the partial regions with the inside spaces having the reduced pressures, and thus there is no need to keep the inside space surrounding the partial regions in the reduced-pressure state with regard to the finished product. Therefore, for example, an interval similar to the interval described as the air passage of the region forming member may be formed in the hermetically-bonding member. Alternatively or additionally, a hollow cylindrical member may be disposed in the hermetically-bonding member instead of the spherical glass bead as the height keeping member so as to penetrate the hermetically-bonding member, and the inside space of the hollow cylindrical member may be used as the outlet. Note that, two or more outlets may be formed in not the glass panel but the hermetically-bonding member, and alternatively, at least one outlet may be formed in each of the glass panel and the hermetically-bonding member.

Further, in the texts relating to the above embodiments, the method of connecting the evacuation pipe to the outlet and reduce the pressure of the inside space with the evacuation pipe is described. Use of the evacuation pipe facilitates connection with the vacuum pump, and thus the pressure of the space between the pair of glass panels can be reduced by a conventional evacuation method. However, the evacuation pipe is dispensable for evacuating the space between the pair of glass panels. For example, by hermetically connecting the vacuum pump to the hermetically bonded glass panels with a ring member with predetermined flexibility allowing the ring member to be in close contact with a surface of the glass panel at a vicinity of a part in which the outlet is formed, the inside space can be made be in the reduced-pressure state without using the evacuation pipe.

Note that, in the multiple pane produced by the production method of multiple panes of the present disclosure, already established techniques of multiple panes such as appropriately forming functional films made of organic or inorganic material in order to give various types of optical functions such as reflection prevention and absorption of ultraviolet or thermally insulating properties to the glass panels can be added or applied. For example, by coating a front surface or a rear surface of at least one of the glass panels constituting the multiple pane with a thin film made of oxide such as tin oxide ($SnO_2$), indium tin oxide (ITO), and zinc oxide by a conventional method such as CVD (chemical vapor deposition) or a film of silver and oxide layers stacked alternately by a sputtering device, an infrared reflection film reflecting a large amount of light in an infrared region can be provided, and thus the thermally insulating properties of the multiple pane can be improved. Further, in this case, when the space has a hollow structure, or is of low thermal conductive material, it is possible to obtain the multiple pane with higher thermally insulating properties.

Further, it is possible that a getter member for improving a degree of vacuum is disposed in an inside space 3 of a multiple pane. Particularly, in the multiple pane of the present disclosure, the getter member can be disposed in the inside space other than the partial regions to be cut out. In this case, the finished product which is the cut out multiple pane does not include the getter member, and nevertheless the multiple pane includes the reduced pressure space having the high degree of vacuum owing to the getter member.

Further, a multiple pane with a curved shape as a whole can be realized by use of curved glass panels curved in one direction or two or more directions instead of flat glass panels described in the text relating to the above embodiment, as glass panels constituting a multiple pane.

Furthermore, it is possible to form a multiple pane in which three or more glass panels are stacked at predetermined intervals as a whole by replacing at least one of the pair of glass panels by another multiple pane. In this case, it is sufficient that at least one part of a stacked multiple pane in the thickness direction may be a multiple pane produced by the production method of the present disclosure. Therefore, a multiple pane produced by the production method of the present disclosure may be used in various ways, and for example, a multiple pane where a space between glass panels is filled with inert gas, a multiple pane produced by the production method of the present disclosure or another method, or a multiple pane in which glass panels are stacked at predetermined intervals but spaces therebetween have atmospheric pressure may be stacked on a multiple pane produced by the production method of the present disclosure.

The multiple panes produced by the production method of multiple panes of the present disclosure as described above have high thermally insulating effects, and can be preferably applied to window panes as eco glass easy in handling. Further, for example, when multiple panes produced by the production method of multiple panes of the present disclosure are disposed in doors of refrigerators and freezers, the multiple panes have high thermally insulating effects, and thus allow check of insides of refrigerators and freezers without interfering functions of refrigerators and freezers. Hence, it is expected that the multiple panes are used in household and business.

Note that, techniques of dividing the glass panel while keeping the evacuated space in the reduced-pressure state in accordance with the present disclosure can be applied to, in addition to multiple panes, display devices prepared by evacuating predetermined spaces by use of evacuation pipes, such as plasma display panels and fluorescent indication devices, and it is possible to produce finished products of display devices devoid of protrusions such as evacuation pipes like products of the present disclosure.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

As described above, it is possible to produce multiple panes easy in handling in a simplified manner, and therefore the production method of multiple panes of the present disclosure is useful.

The invention claimed is:

1. A production method of multiple panes comprising:
hermetically bonding, with a hermetically-bonding member, peripheries of paired glass panels disposed facing each other at a predetermined distance to form a space to be hermetically enclosed between the glass panels;
evacuating air from the space through an outlet to make the space be in a reduced-pressure state;
subsequently dividing the space by a plurality of region forming members disposed inside the space to form at least two partial regions which do not include the outlet; and
subsequently cutting out the at least two partial regions by cutting the pair of glass panels.

2. The production method of multiple panes of claim 1, wherein: the plurality of region forming members include at least one air passage interconnecting an inside and an outside of the at least two partial regions; and after the space is in the reduced-pressure state, the space is divided by closing the at least one air passage to form the at least two partial regions.

3. The production method of multiple panes of claim 2, wherein: the at least one air passage is an opening in the plurality of region forming members; and after the space is in the reduced-pressure state, the opening is closed by melting the plurality of region forming members.

4. The production method of multiple panes of claim 1, wherein: a formation height of the plurality of region forming members before being melted is less than a formation height of the hermetically-bonding member before being melted; and after the space is made to be in the reduced-pressure state after the pair of glass panels are hermetically bonded by melting the hermetically-bonding member, the space is divided by the plurality of region forming members by decreasing the distance between the pair of glass panels to form the at least two partial regions.

5. The production method of multiple panes of claim 1, wherein: a melting-temperature of the plurality of region forming members is higher than a melting-temperature of the hermetically-bonding member; the space is formed by hermetically bonding the pair of glass panels at a temperature causing melting of the hermetically-bonding member to form the space; and after the space is in the reduced-pressure state, the space is divided by melting the plurality of region forming members at a temperature causing melting of the plurality of region forming members to form the at least two partial regions.

6. The production method of multiple panes of claim 1, wherein: after the space is formed by conducting melting inside a furnace to melt the hermetically-bonding member, and subsequently the space is made to be in the reduced-pressure state after the glass panels are removed from the furnace, the space is divided by conducting again melting inside the furnace to melt the plurality of region forming members to form the at least two partial regions.

7. The production method of multiple panes of claim 1, wherein the outlet is formed in at least one of the pair of glass panels.

8. The production method of multiple panes of claim 1, wherein the hermetically-bonding member and the plurality of region forming members are made from glass frit.

9. The production method of multiple panes of claim 1, wherein a spacer for keeping a gap between the pair of glass panels is disposed on a surface of at least one of the pair of glass panels.

10. The production method of multiple panes of claim 1, wherein a height keeping member for keeping a gap between the pair of glass panels is disposed at a portion on which the hermetically-bonding member is to be formed.

11. The production method of multiple panes of claim 9, wherein the spacer is formed by photolithography.

12. The production method of multiple panes of claim 10, wherein the height keeping member is formed by photolithography.

* * * * *